(12) United States Patent
Roddis et al.

(10) Patent No.: US 8,056,902 B2
(45) Date of Patent: *Nov. 15, 2011

(54) ISOLATOR SEAL

(75) Inventors: Alan James Roddis, Sheffield (GB); Andrew Colverson, Conisbrough (GB)

(73) Assignee: AES Engineering Ltd., Rotherham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,585

(22) Filed: May 10, 2010

(65) Prior Publication Data

US 2010/0219585 A1    Sep. 2, 2010

Related U.S. Application Data

(62) Division of application No. 11/571,369, filed as application No. PCT/GB2005/002743 on Jul. 12, 2005, now abandoned.

(30) Foreign Application Priority Data

Jul. 12, 2004 (GB) .................................. 0415548.7
Apr. 7, 2005 (GB) .................................. 0507058.6

(51) Int. Cl.
*F01D 11/02* (2006.01)
*F16J 15/447* (2006.01)

(52) U.S. Cl. .................... 277/347; 277/412; 277/433

(58) Field of Classification Search ................. 277/347, 277/412, 433
See application file for complete search history.

(56) References Cited

U.S. PATENT DOCUMENTS

| | | | | | |
|---|---|---|---|---|---|
| 2,352,336 | A | * | 6/1944 | Martin et al. | 277/433 |
| 2,894,769 | A | * | 7/1959 | Richmond et al. | 277/362 |
| 3,256,027 | A | * | 6/1966 | Chapel | 277/426 |
| 4,290,497 | A | * | 9/1981 | Barnetche | 175/371 |
| 4,428,587 | A | * | 1/1984 | Forch | 277/424 |

\* cited by examiner

*Primary Examiner* — Vishal Patel
(74) *Attorney, Agent, or Firm* — Edwin D. Schindler

(57) ABSTRACT

An isolator seal includes a stator member for placement into the stator of rotating equipment and a rotor member for placement onto a rotary shaft of the rotating equipment. The stator member and the rotor member provide respective adjacent surfaces, while a static shut-off device engages both adjacent surfaces when the rotor member is static and disengages one or more of the surfaces when the rotor member is dynamic. In one embodiment of the invention at least one of the surfaces is inclined to the longitudinal axis at an angle greater or less than 90°. In a further embodiment, the static shut-off device includes a resilient annular sealing member and an auxiliary member, which can move between a first position, when the rotor member is static, at which the auxiliary member compresses the resilient annular member into engagement with both surfaces, and a second position at which the compression on the resilient member is reduced, so that the resilient annular member disengages one or more of the rotor and stator surfaces when the rotor is dynamic.

12 Claims, 36 Drawing Sheets

Section A-A

Section B-B

View C-C

ISOLATOR SEAL

CROSS-REFERENCE TO PRIOR APPLICATION

This is a division of application Ser. No. 11/571,369, filed Jan. 18, 2007, now abandoned, which represents the U.S. National Phase application of P.C.T. Application No. PCT/GB2005/002743, filed Jul. 12, 2005.

FIELD OF THE INVENTION

This invention relates to isolator seals and their use in rotating equipment, especially devices which prevent the ingress or egress of a fluid or solid to a cavity, which results in deterioration of equipment life. Such devices are often referred to as bearing protectors, bearing seals or bearing isolators. However, the use of such rotary seals extends well beyond the protection of a bearing in rotating equipment. Accordingly, while reference will be made below to bearing protectors, it should be understood that the seals of this invention have wider uses.

BACKGROUND TO THE INVENTION

The purpose of a bearing protector is to prevent the ingress of fluid, solids and/or debris from entering a bearing chamber. Equally, bearing protectors are employed to prevent the egress of fluid or solids from a bearing chamber. Essentially, their purpose is to prevent the premature failure of the bearing.

Bearing protectors generally fall into two categories: repeller or labyrinth bearing protectors; and mechanical seal bearing protectors. Reference is made to our co-pending mechanical seal bearing protection application WO-A-2004005770, which discloses a substantially contacting bearing protector.

A labyrinth bearing protector typically includes a component which is mounted for rotation about a shaft and axially fixed in relation thereto. For example, the shaft may be that of a pump or other piece of rotating equipment. The protector includes a static component which is also axially fixed and is butted or secured to the stationary part of the equipment.

The rotating component typically has a complex outer profile which is located adjacent and in close radial and axial proximity to a complex inner profile of the stationary component. Together these complex profiles, in theory, provide a tortuous path preventing the passage of the unwanted materials or fluids.

A labyrinth bearing protector normally works only during the operation of the equipment. This is because the design relies on the counter rotation of the rotary and stationary component to create centrifugal forces, which discourage the passage of fluid radially between such components.

When the equipment is static, the complex labyrinth design is unable to hold a fluid level which, in horizontal application, is at a higher radial level than the inlet position of the protector.

Furthermore, in many industrial applications, water spray, steam and foreign contaminants are directed at the bearing protector when the equipment is static. Traditional labyrinth designs are unable to prevent the entry of such contaminants into the bearing chamber.

Also, bearing chamber breathing is a further industrial field problem. During operation the lubrication fluid and air in the bearing chamber expand as it warms. In a traditional labyrinth seal arrangement this expansion will expel air through the labyrinth and "breath" out of the bearing chamber. Once the equipment stops, the bearing chamber cools and the air inside contracts, sucking moist air past the labyrinth arrangement and back into the bearing chamber. This is referred to as "breathing" in.

A mechanical seal bearing protector can overcome the static limitations of the labyrinth design. However, these devices can suffer from other problems such as excessive heat generation in high shaft speed applications or when there is marginal or no lubrication at the seal faces. Therefore the use of mechanical seal bearing protectors is limited.

There is a need for a non-contacting labyrinth-type seal bearing protector which can seal fluids when the equipment is stationary and/or can prevent and/or reduce the volume of air-born molecules entering the bearing chamber during chamber breathing.

It would also be of advantage if a non-contacting labyrinth-type seal could repel fluid irrespective of the direction of shaft rotation. This reduces the likelihood or effect of installation error.

It could be of further advantage if a non-contacting labyrinth-type seal incorporates two repelling devices, one designed to repel fluid from escaping the bearing chamber and one designed to repel fluid from entering the bearing chamber.

Furthermore, installation ease is important with all bearing protector designs. A non-contacting labyrinth-type seal which is very axially compact is desirable so that it may be fitted into spaces previously occupied by lip seals and supplied in a one piece cartridge unit with no setting clips.

U.S. Pat. No. 5,378,000 (Orlowski) discloses a cartridge design having a labyrinth configuration in which the rotor and stator are locked together axially by a solid deformable annular seal or an elastomer. The elastomer is locked between two counter-rotating rectangular shaped cavities as illustrated in FIGS. 3 and 4 of Orlowski. The elastomer is subject to frictional resistance, less by the stator and more by the rotor. The elastomer in Orlowski therefore suffers from frictional wear between the two counter-rotating bodies. This frictional wear is exacerbated by the following:

The acute angle between surfaces 23 and 22b of the rotor 14 and the 90 degrees angle of the three remaining corners of grooves 21 and 22, which come into contact with the elastomer (20). Orlowski relies on the relatively un-chamfered surfaces of these four points in contact with the elastomer, so to maintain axial proximity between the rotor and stator.

All commercially available elastomers have a cross-sectional size tolerance. This is typically +/−3% of their nominal diameter. The magnitude of Orlowski's defined frictional resistance, is therefore highly variable given this elastomer tolerance and the fact that grooves 21 and 22 will have an associated manufacturing width tolerance also.

During assembly of the seal onto the equipment, the device is axially pulled and pushed as it is moved into its final running position. This axial displacement is particularly due to the frictional drag forces from the rotary elastomer 15 and the shaft 10. This axial displacement places the elastomer 20 under shear forces since it is this elastomer which is the only element axially locking the rotor and stator together. It is therefore highly probable that the frictional resistance between the elastomer and the sides of grooves 21 and 22 will change during assembly.

All of these facts influence and rapidly increase the wear on the elastomer 20 and as such limit the elastomers useful sealing life against the ingress or egress of matter.

STATEMENTS OF THE INVENTION

According to a first aspect of the present invention there is provided an isolator seal comprising:
- a stator member for location into the stator of rotating equipment;
- a rotor member for location onto a rotary shaft of said rotating equipment;
- said stator member and said rotor member providing respective, adjacent surfaces;
- a static shut-off device comprising a resilient annular sealing member which engages both adjacent surfaces when the rotor is static and disengages one or more of said rotor and stator surfaces when the rotor is dynamic; and
- wherein at least one of said surfaces is inclined to the longitudinal axis at an angle greater or less than 90°.

Preferably the inclination of said at least one of said surfaces to the longitudinal axis is from 5° to 175°, more preferably from 10° to 80° or from 100° to 120° and most preferably from 30° to 60° or from 120° to 150°. In a particular embodiment of the invention the inclination may be about 45°.

According to a second aspect of the invention there is provided an isolator seal comprising:
- a stator member for location into the stator of rotating equipment;
- a rotor member for location onto a rotary shaft of rotating equipment;
- said stator member and said rotor member providing respective, adjacent surfaces; and
- a static shut-off device comprising a resilient annular sealing member and an auxiliary member, movable between a first position, when the rotor member is static, at which said auxiliary member compresses said resilient annular member into engagement with both said surfaces and a second position at which the compression on said resilient member is reduced, whereby the resilient annular member disengages one or more of said rotor and stator surfaces when the rotor is dynamic.

Preferably said resilient sealing member is toroidal.

Preferably the seal further includes a labyrinth seal formed between said rotor member and said stator member.

Preferably the seal further includes at least one bi-directional repelling pumping device.

Preferably the surfaces of said rotor member and said stator member are both inclined to the longitudinal axis at an angle greater or lesser than 90°.

Preferably the rotor and stator members are axially separated but constrained against relative axial movement by at least one radially extending member formed on one of said rotor and stator member.

More preferably said rotor and stator members are axially constrained by two or more radially extending members.

Preferably the stator member is provided with at least one communication orifice extending between an inner surface of the stator member and an outer surface of the stator member. More preferably said communication orifice is adjacent to a radially extending member provided on said rotor member. Preferably said inner surface of said stator member is substantially eccentric to the rotor member and/or, in use, the rotary shaft.

Preferably the communication orifice is positioned, in use, at the lowest radial point on the seal.

Preferably the stator member is provided with a radially inward extending groove on its outermost surface and its substantially eccentric innermost surface, said radially extending groove extending to the radially most outward point of the innermost surface creating a communication orifice connecting the innermost and outermost surfaces of said stator member.

Preferably said surfaces of the rotor member and the stator member together form a "v" shape. More preferably the resilient annular member rests within the said "v" shape at a radial position greater than the nominal radial position of the resilient and annular member in its free state.

Preferably the rotor member is provided with at least two repelling pumping devices which are axially separated.

Preferably the rotor and stator members are each one monolithic piece.

Preferably the rotor and stator members are axially restrained with respect to each other by one or more radially extending shoulders, said shoulders extending from either the rotor member or the stator member or from a combination of said members.

In one preferred embodiment, the rotor member comprises two axially joined members and the stator member is one monolithic piece. The first of the rotor member parts may radially locate into the second of the rotor member parts, both being joined by means of mechanical, chemical or other securing means to create either a permanent or a non-permanent attachment.

A seal of the present invention preferably includes a stator housing which has at least one radially outwardly positioned location element for locating with the equipment chamber. Said location element may be located adjacent to a radially extending groove, which contains at least one elastomeric member for sealing the housing to the equipment chamber. The housing is also preferably provided with at least one radially extending outward surface which axially abuts to said equipment chamber.

Preferably the rotor contains at least one repelling pumping device comprising of at least one radially inwardly extending feature positioned on the circumference of said rotor.

Preferably the rotor contains at least two repelling pumping devices which are axially displaced.

Preferably the repelling pumping device comprises continuous and substantially concentric rotor surface which corresponds to a substantially non-concentric stator surface.

Preferably the repelling pumping device comprises at least one radially inwardly extending feature positioned on the circumference of said rotor.

Preferably the rotor contains at least one repelling pumping device comprising at least one radially inwardly extending feature positioned on the circumference of said rotor, adjacent to a substantially radially inclined inner surface of the stator.

Preferably the rotor contains at least two repelling pumping devices which are axially displaced. Each repelling pumping device comprises at least one radially inwardly extending feature positioned on the circumference of said rotor adjacent to a substantially radially inclined inner surface of the stator.

Preferably the stator housing contains at least one inner feature, which has a centre position offset to the centre position of the shaft. Preferably said eccentric inner feature of stator housing is adjacent to at least one repelling pumping device in the rotor.

Preferably the stator housing contains at least one radial communication feature which communicates the innermost surface of the housing to the outermost surface of the housing. Said radial communication feature, or drain orifice, is preferably adjacent to at least one of the repelling pumping devices.

Preferably the stator housing comprises two, axially joined members and the rotor is one monolithic piece.

Preferably one stator radially locates into the second stator, both joined via mechanical, chemical or any other securing means to create both permanent or non-permanent attachment.

Preferably, the radially outer stator incorporates a radial extending feature, on its outermost surface. Said radial extending feature is adjacent to the radial location of the two rotor members.

Preferably the rotor contains at least one radially extending feature on its outer surface, said feature is positioned adjacent and in close proximity to an inner surface of the stator.

Embodiments of labyrinth seals in accordance with the present invention may be such that at least one rotary member and/or one stationary member can be mechanically attached to the items of rotary equipment.

A seal of the invention may include a stator housing having at least one axial through hole or slot for accommodating a stud or bolt in an item of rotating equipment, thereby allowing the housing of the mechanical seal to be secured to the rotating equipment.

Preferably, a first housing stator radially locates into a second housing stator, said first housing stator is indirectly axially connected to the shaft via a rotor, said second housing stator is directly connected to the stationary housing of the equipment. Said first housing stator is allowed to axially slide with respect to the second housing stator. Preferably, said axial displacement is mechanically restricted, thereby maintaining a cartridge solution.

Preferably, a first housing stator radially and axially locates into a second housing stator, said first housing stator is indirectly angularly connected to the shaft via a rotor, said second housing stator is directly connected to the stationary housing of the equipment. Said first housing stator is allowed to angularly slide with respect to the second housing stator. Preferably, said angular displacement is mechanically restricted, thereby maintaining a cartridge solution.

Embodiments of labyrinth seals in accordance with the present invention may be such that at least one rotary member and/or one stationary member is axially split for attachment onto the equipment. Preferably, said split components are mechanical secured radially together, post installation on the equipment. Also preferably, said split design preferably includes at least one radially split elastomer, which post installation around the shaft, is joined by permanent means.

The invention also provides a bearing protector in the form of a non-contacting labyrinth-type seal.

Reference is made herein to a resilient sealing member in the form of an elastomer or o-ring which forms the or part of the static shut-off device. It should be understood that any elastomeric or solid deformable material may be suitable. While the sealing members shown in the accompanying drawings are of circular cross-section, it should be understood that they may have a different shape, including one providing a combination of flat and/or circular surfaces.

DETAILED DESCRIPTION OF THE INVENTION

The invention will now be described, by way of examples only, with reference to the accompanying drawings.

In general rotary seals in accordance with the present invention may be used not only in the case where the shaft is a rotary member and the housing is a stationary member but also the reverse situation, that is to say, in which the shaft is stationary and the housing is rotary.

Furthermore, the invention may be embodied in both rotary and stationary arrangements, and in cartridge and component seals with metallic components as well as non-metallic components.

Figure 1:
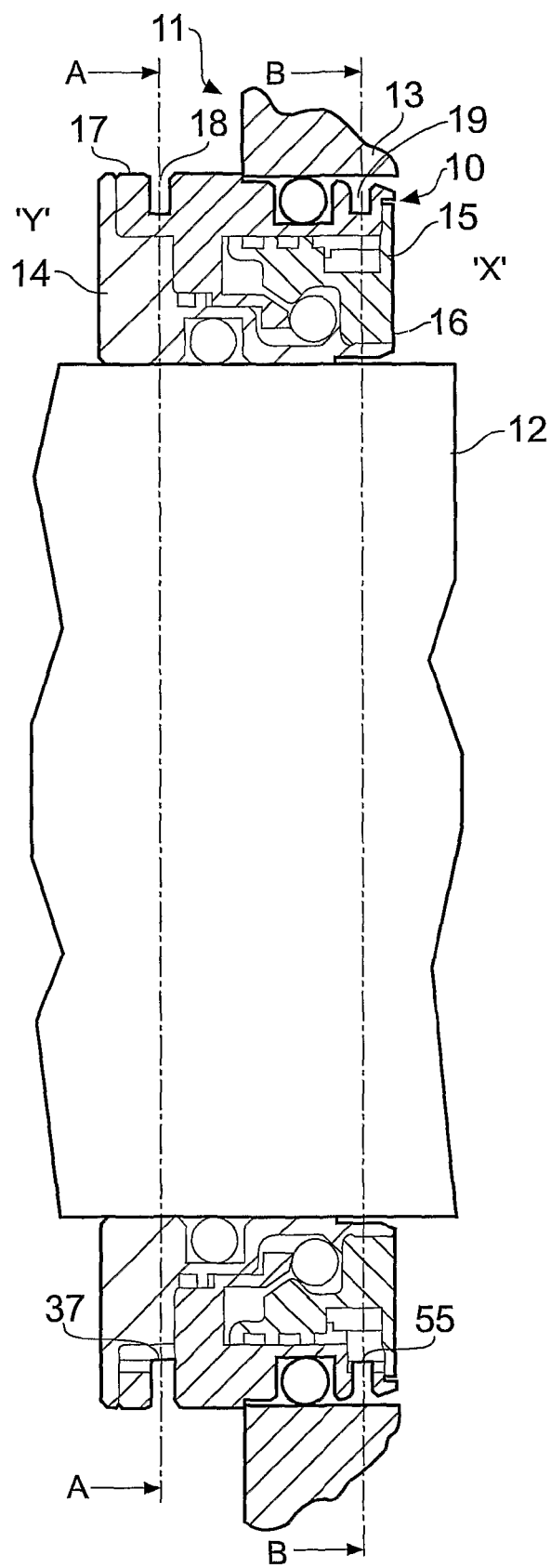
FIG. 1 is a half longitudinal section view of an embodiment of a labyrinth seal bearing protector of the invention mounted on a shaft.

Referring to FIG. 1 of the accompanying drawings, there is illustrated the first embodiment of the invention, a bearing protector assembly 10 which is fitted to an item of rotating equipment 11. The equipment includes a rotating shaft 12 and a stationary housing 13. The stationary housing 13 could typically contain a bearing, which is not illustrated.

Area "X" at one axial end of the bearing protector assembly 10 could partially contain fluid and/or solids and/or foreign debris and/or atmosphere. However, for clarity it will herewith be referred to as "product substance" to describe a single or mixed medium.

Area "Y" at the other axial end of the bearing protector assembly 10 could also partially contain fluid and/or solids and/or foreign debris and/or atmosphere. However, it will be referred to as "atmospheric substance" to describe a single or mixed medium.

The bearing protector assembly 10 includes a rotor assembly 16 comprising a first rotor member 14, which is radially and axially located to a second rotor member 15. The rotor assembly 16 is positioned adjacent a stator member 17.

Figure 2A:
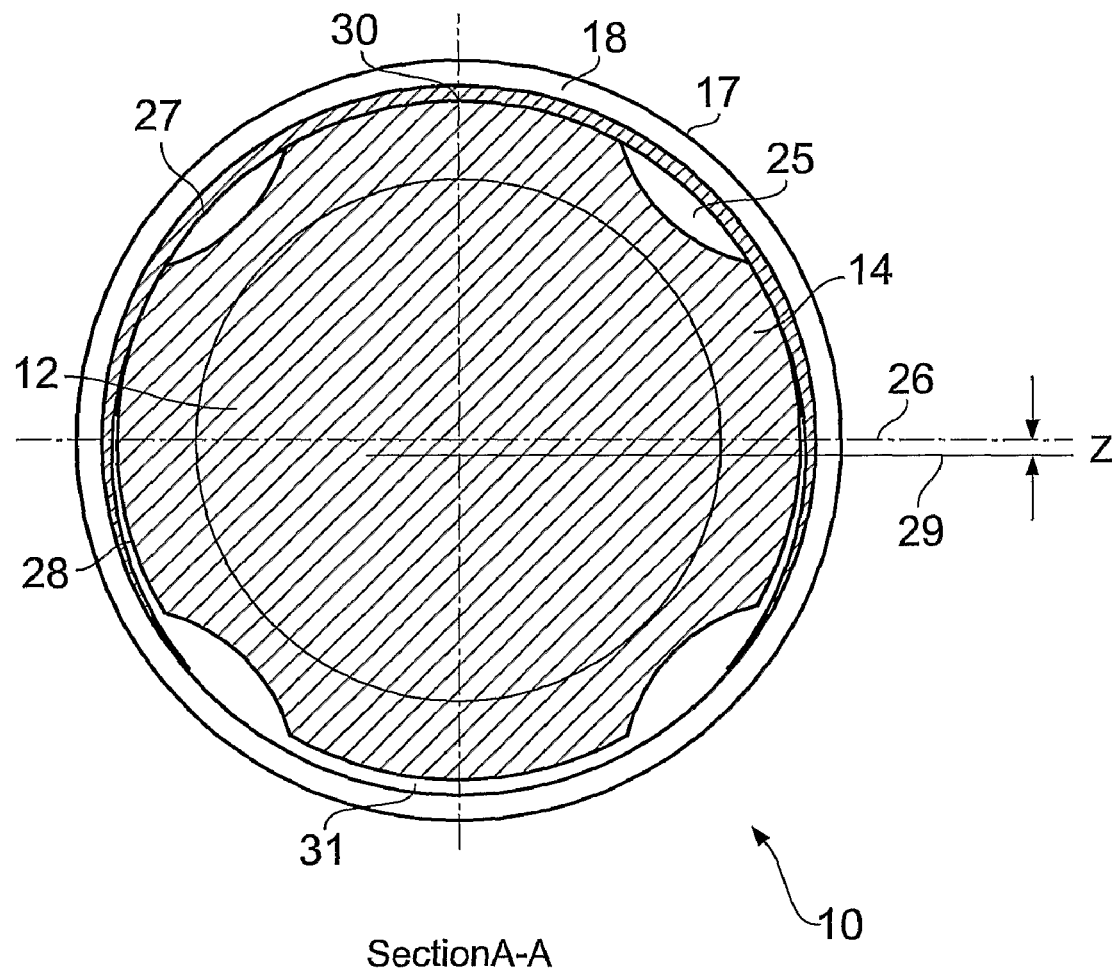
FIG. 2A corresponds to FIG. 1 and shows a section through the pumping repeller on line A-A.

A lateral section A-A is shown in FIG. 2A. This is a section through groove 18 on the outermost radial surface of stator 17.

Figure 2B:
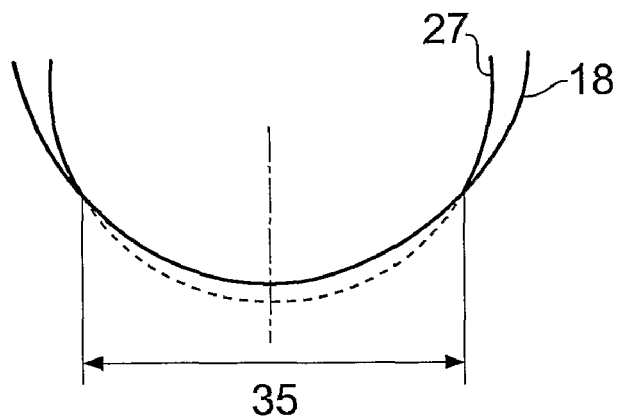
FIG. 2B corresponds to FIG. 2A and shows an enlarged view of the drain orifice.
Figure 2C:
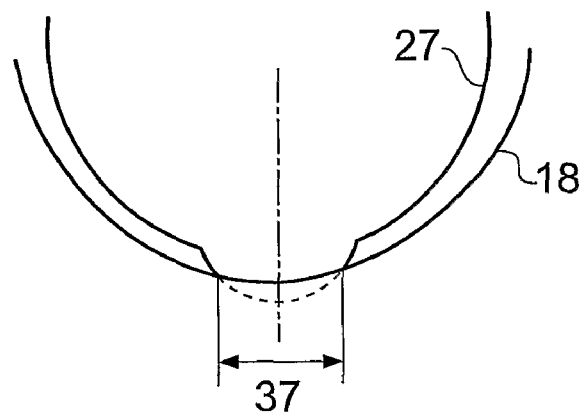
FIG. 2C corresponds to FIG. 2A and shows an alternative design of the drain orifice.
Figure 2D:
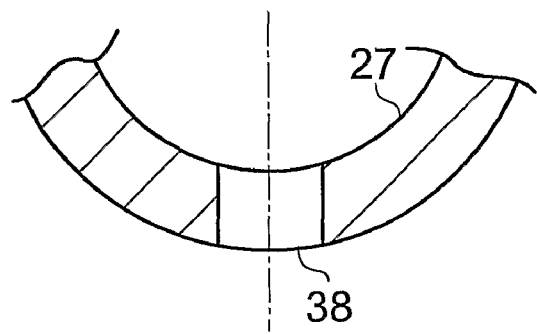
FIG. 2D shows a further design of the drain orifice.
Figure 2E:
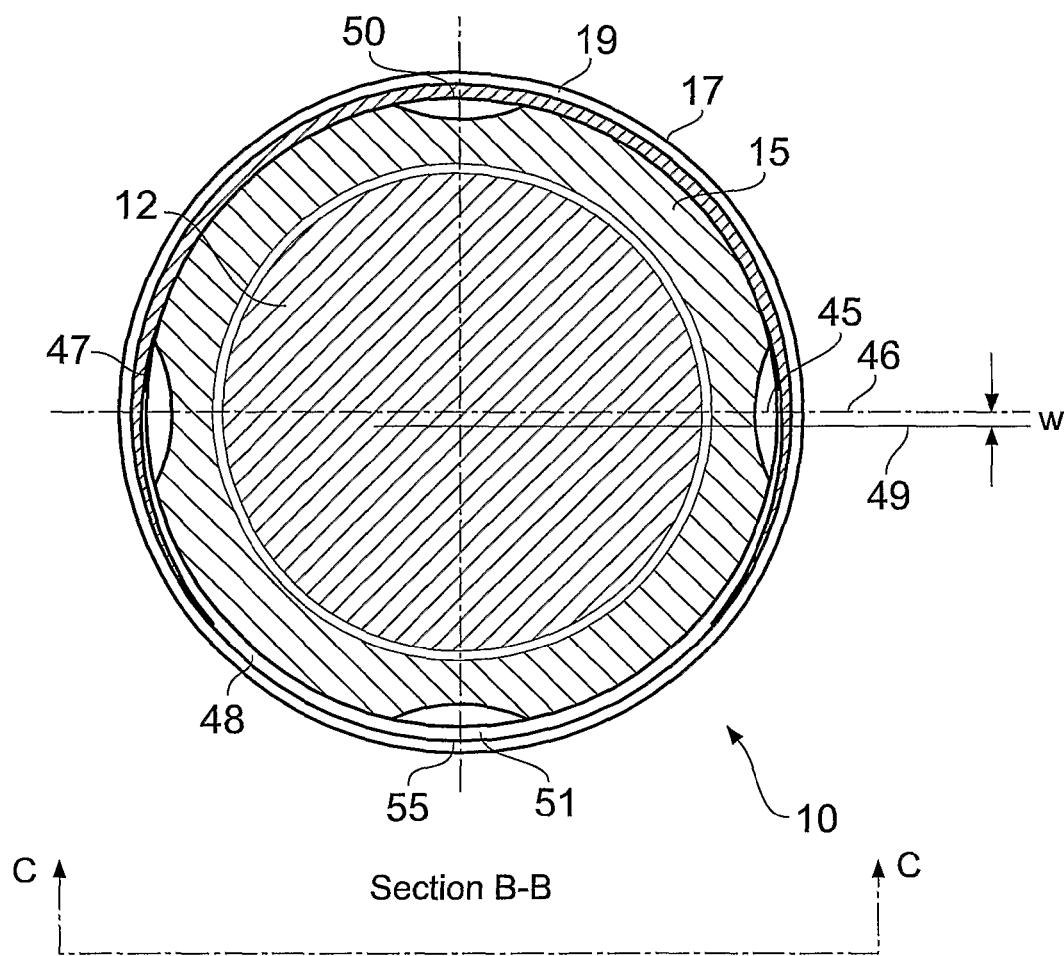
FIG. 2E corresponds to FIG. 1 and shows a section through the pumping repeller on line B-B.

A lateral section B-B is shown in FIG. 2E. This is a section through groove 19 on the outermost radial surface of stator 17.

Referring to FIG. 2A, the first rotor member 14 incorporates at least one radially extending feature, namely slot 25. The rotor 14 is substantially concentric to the shaft 12 and therefore rotates on the shaft centre line 26. The stator 17 contains at least one inner feature, namely stator pumping bore 27. The radial gap between the outermost surface of rotor 14 and innermost surface of the stator pumping bore 27 provides a pumping chamber 28.

From FIG. 2A, the stator pumping bore 27 is substantially eccentric to both rotor 14 and shaft 12 and has a centre line 29. The eccentricity magnitude between rotor 14 and stator pumping bore 27 is shown as the radial distance "Z" between respective centre lines 26 and 29.

A result of this eccentricity, the radial gap between the rotor 14 and stator pumping bore 27, is not constant around the circumference of the assembly 10. As shown in FIG. 2A, the radial gap 30 at the 12 o'clock position is substantially smaller than the radial gap 31 shown at the 6 o'clock position.

Any fluid entering the pumping chamber 28 is subjected to the changes in radial gap, as it is circumferentially carried by the rotor slot 25. This change in radial gap creates a change in the pressure of the fluid operating in the radial gap. This change in fluid pressure encourages circumferential fluid movement from the small radial gap position 30 to the large radial gap position 31.

From FIG. 2A, external groove 18 in stator 17 is also substantially concentric to the shaft 12. At the radially lowest position on the sectioned end view, referred to as 6 o'clock, FIG. 2A illustrates a radial breakthrough of the concentric groove 18 with the stator pumping bore 27. An enlarged view of this feature is shown in FIG. 2B. From FIG. 2B this breakthrough creates the communication orifice 35 between the innermost region of the stator 17 to the outermost region of the stator 17. The advantage of this automatically generated communication orifice 35 is that the orifice will always occur at the largest radial gap position 31 independent of the machine, manufacturing technique or operator employed. This offers advantages for the supply company.

FIG. 2C corresponds to FIG. 2B and shows an alternative embodiment where said stator pumping bore 27 includes an additional radially extending inner region 36. This radially extending region creates an automatic communication orifice 37 of which the length of the orifice 37 is more tightly controlled with less variation, given the associated natural manufacturing tolerances of bore 27 and groove 18.

FIG. 2D corresponds to FIG. 2B and shows yet another alternative embodiment where the communication office 38 is provided by a milled slot or a drilled hole extending through stator 17.

FIG. 2E corresponds to FIG. 1 and illustrates a further embodiment showing a repelling pumping arrangement adjacent to the product substance side.

From FIG. 2E and FIG. 1, the second rotor 15 incorporates at least one radially extending feature, namely, slots 45. The rotor 15 is substantially concentric to the shaft 12 and therefore rotates on the shaft centre line 46. The stator 17 includes at least one inner feature, namely, stator pumping bore 47. The radial gap between the outermost surface of rotor 15 and innermost surface of the stator pumping bore 47 is pumping chamber 48.

The stator pumping bore 47 is substantially eccentric to both rotor 15 and shaft 12 and has a centre line 49. The eccentricity magnitude between rotor 15 and stator pumping bore 47 is shown as the radial distance "W" between respective centre lines 46 and 49.

As a result of this eccentricity, the radial gap between the rotor 15 and stator pumping bore 47 is not constant around the circumference of the assembly 10. As shown in FIG. 2E, said radial gap 50 at the 12 o'clock position is substantially smaller than the radial gap 51 at the 6 o'clock position.

Once again, any fluid entering the pumping chamber 48 is subjected to the changes in radial gap, as it is circumferentially carried by the rotor slot 45. This change in radial gap creates a change in the of the fluid operating in the radial gap. This change in fluid pressure encourages circumferential fluid movement from the small radial gap position 50 to the large radial gap position 51.

The radially extending, non-circumferentially continuous rotor slots or indentations 45 on the rotor outer surfaces are not essential to promote fluid movement. The action of two counter-rotating surfaces, non-concentrically aligned, is often sufficient to repel and/or pump fluid.

Equally, two counter-rotating surfaces, substantially concentrically aligned, one, preferably the rotor, containing a radially extending, non-circumferentially continuous rotor slot or indentation can be sufficient to repel and/or pump fluid.

Figure 2F:
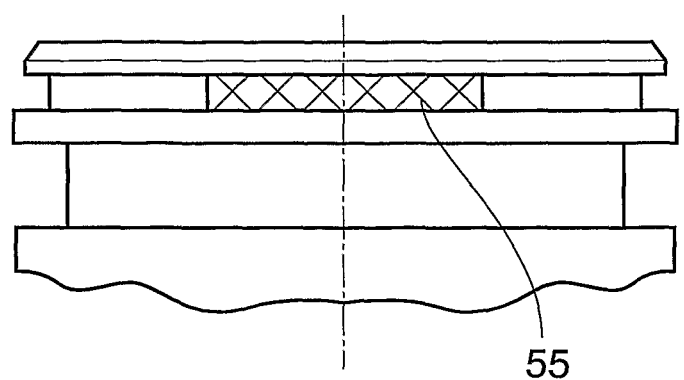
FIG. 2F corresponds to FIG. 2E and shows a plan view on C-C.

From FIGS. 2E and 1, the external groove 19, in stator 17 is substantially concentric to the shaft 12. At the radially lowest position on the sectioned end view, referred to as 6 o'clock, FIG. 2E illustrates a radial communication breakthrough 55 of the concentric groove 19 with the stator pumping bore 47. This is illustrated further on FIG. 2F, which is a plan view on view C-C of FIG. 2E. This breakthrough creates the communication orifice 55 between the innermost and outermost regions of the stator 17. This combination of external concentric groove 19 and eccentric stator pumping bore 47 creates an automatic communication orifice 55 at the largest radial gap position 51.

Clearly, the position of the communication orifice 55 may be at any circumferential location with respect to the changing radial gap between the rotor and stator. For example, in some applications the communication orifice may be more suitably at a position adjacent to the smallest radial gap position between rotor and stator, as this corresponds to the position of highest fluid pressure difference, thereby making use of the relatively high fluid pressure to force fluid out of the communication orifice.

The experienced reader will note that one or two pumping systems may be employed. Preferably, a dual repelling pumping system is provided, with a repeller at the atmospheric substance side and a repeller at the product substance side, since both the ingress and egress of substance is repelled from each side of the assembly 10.

The large radial gaps 31 and 51, and hence the communication orifices 37 and 55, could be positioned, should the need arise, at any angular relationship to each other by simply changing the angular machined orientation between the eccentric pumping bores on the atmospheric and product substance ends of stator 17.

The number and/or size and/or respective angular orientation of pumping slots 25 and 45 could be changed to suit the application being sealed.

Preferably, the repelling pumping designs on both sides of the invention should be approximately in balance and equal to one another so not to promote ingress and/or egress in any particular way.

Figure 3:
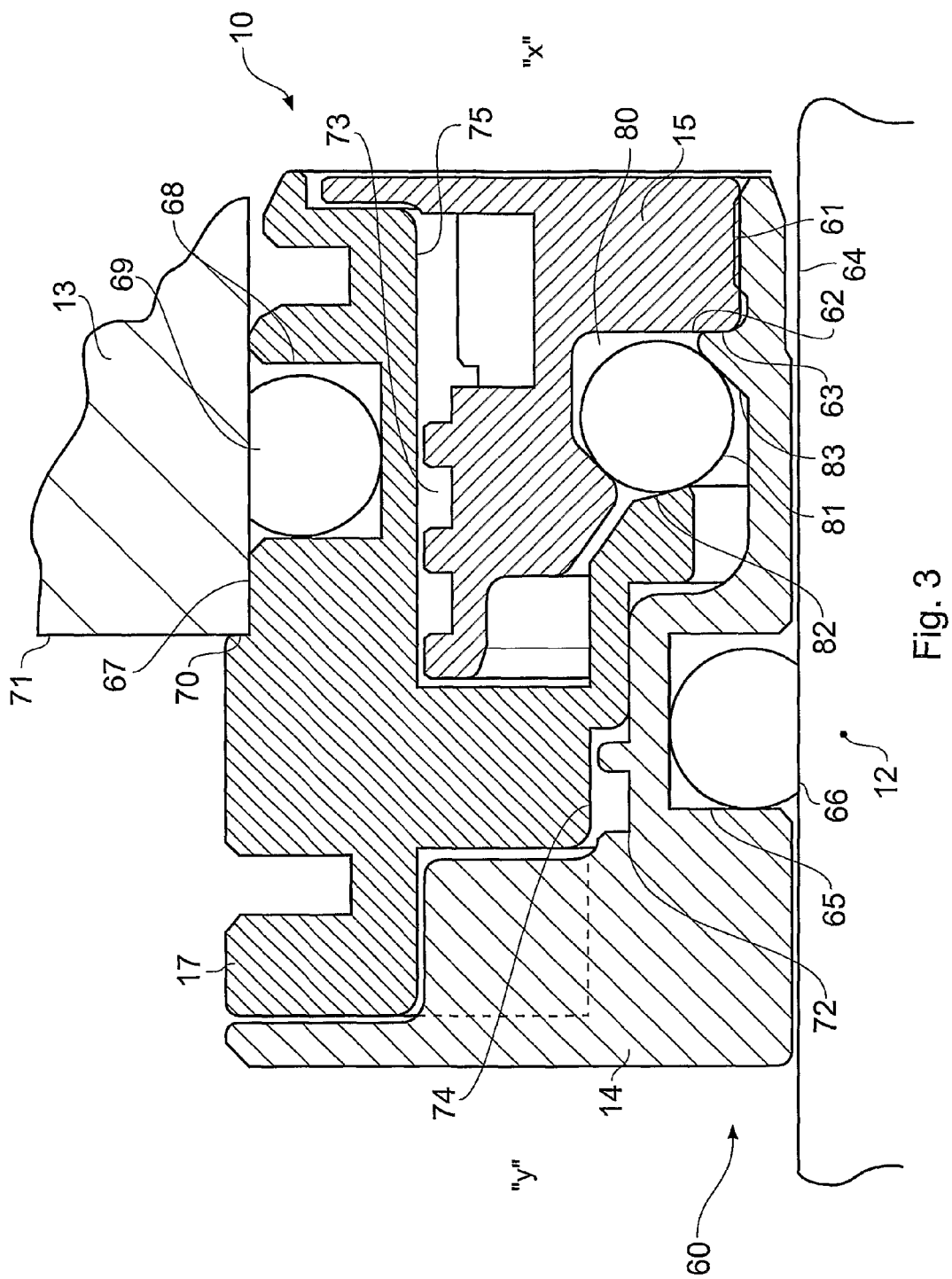
FIG. 3 corresponds to FIG. 1 and shows an enlarged part longitudinal cross section.

Referring to FIG. 3, the bearing protector is a cartridge unit, supplied without any setting device. Preferably the rotor assembly 60 comprises two, axially joined rotor members, 14 and 15. Preferably the first rotor 14 radially locates into the second rotor 15 at radial position 61. Both rotors 14 and 15 are axially compressed until the axial face 62 of rotor 15 abuts to the axial shoulder 63 of rotor 14. Preferably, the radial location 61 is a mechanical interference fit thereby securing both rotors together. Alternatively, these parts could be chemically joined via an appropriate adhesive or permanently joined by a welding operation, and/or any combination of such, to create a secure attachment.

Preferably, the radially innermost rotor 14 incorporates a radial extending relief feature 64 on its innermost surface. Feature 64 is adjacent to the radial location 61 of the two rotor members 14 and 15. This relief feature 64 ensures that the bearing protector 10 will slide onto the shaft 12 without radial interference to shaft 12, caused by the radial interference fit 61 between the two rotors 14 and 15.

The end of each rotors 14 and 15 is longitudinally outwardly larger than the innermost radial part of the stator 17. Preferably, the stator 17 is one monolithic piece.

As shown in FIG. 3, the rotor 14 incorporates a radially extending cavity 65 on its innermost surface. Cavity 65 contains an elastomeric sealing device 66 to seal the rotor assembly 60 onto the shaft 12. Elastomer 66 transmits the rotational drive from the shaft 12 to the rotor assembly 14.

Bearing protector 10 preferably includes a stator housing 17, which has at least one radially outwardly positioned equipment chamber location feature 67. Location feature 67 is located adjacent to a radially extending groove 68, which contains at least one elastomeric member 69 for sealing the stator 17 to the inner region of the equipment chamber 13. Stator 17 also contains at least one radially extending outward surface 70 which axially abuts to said equipment chamber 71.

Preferably the rotor 14 and/or 15 contains at least one repelling pumping device such as those described above.

Preferably, the rotor contains at least two repelling pumping devices which are axially displaced. Each repelling pumping device comprises at least one radially inwardly extending feature positioned on the circumference of the rotor.

As shown in FIG. 3, both rotors 14 and 15 incorporate at least one radially inwardly and circumferentially extending castellation feature 72 and 73 positioned on the outermost radial surfaces of rotors 14 and 15. Castellations 72 and 73 could have a square form, as shown, or any form comprising of curved and straight surfaces. This form, for example, could be trapezoidal, v-shape or semi-circular in cross section. As a further example, it could have a screw thread form with a left or right hand pitch.

Said radial rotor surface and castellations 72 and 73 run in close radial proximity, typically 0.005" to 0.010", to the adjacent innermost stator surface 74 and 75 respectively. Clearly, the radial proximity is not limited to 0.005" and could be greater or less than this value.

The innermost radial surfaces 74 and 75 of stator 17, adjacent to the outermost radial surface of the rotor assembly 60, could equally have a castellation feature as previously described. In fact, any combination of rotor or stator castellations could be employed to restrict and/or prevent axial fluid movement.

The bearing protector 10 incorporates a static shut-off device assembly 80 comprising an elastomer 81 which is radially located in a "v" shape positioned radially inwardly of said elastomer 81. This "v" shape is composed of two counter-rotating surfaces, the stator surface 82 and the rotor surface 83.

The elastomer 81 radially rests on said "v" shape at a slightly larger radial position than the nominal radial position of the elastomer 81 when it is in its free state. In practice, this arrangement means that the elastomer 81 operates in a radially stretched manner. As the elastomer 81 is outwardly stretched this arrangement results in a corresponding inwardly radial force acting around the circumference of the elastomer 81 urging it into the composite "v" surfaces 82 and 83. This creates a static seal between the rotor assembly 60 and the stator 17 on surfaces 82 and 83. This arrangement will be described further with reference to FIGS. 6A and 6B.

Figure 6A:
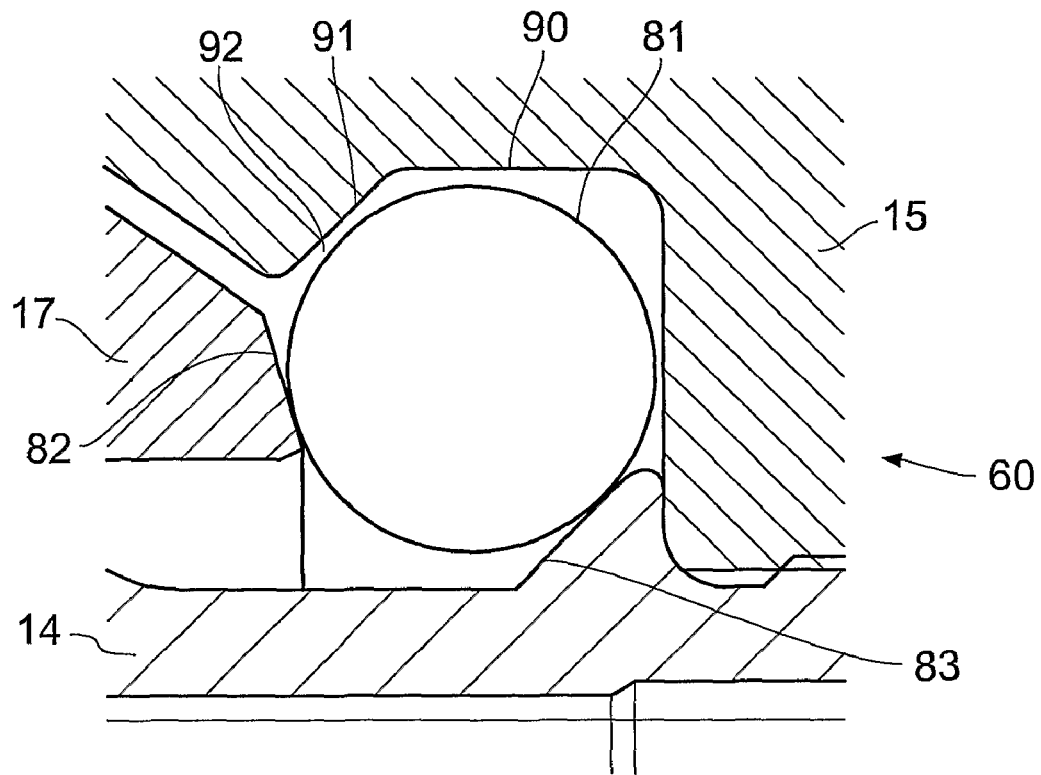
FIG. 6A corresponds to FIG. 1 and shows an enlarged part cross section, showing the shut-off elastomer in its static condition.

From FIG. 6A, the rotor assembly 60 comprises first rotor 14 and second rotor 15. Second rotor 15 extends radially outwardly beyond the outermost surface of elastomer 81. Rotor 15 incorporates radially inward surfaces 90 and 91. The surface 91 is radially and axially inclined.

A gap 92 exists between the inclined surface 91 and the outer surface of the elastomer 81. Gap 92 allows the elastomer 81 to be free from outward frictional resistance during low shaft 12 velocity applications.

Figure 6B:
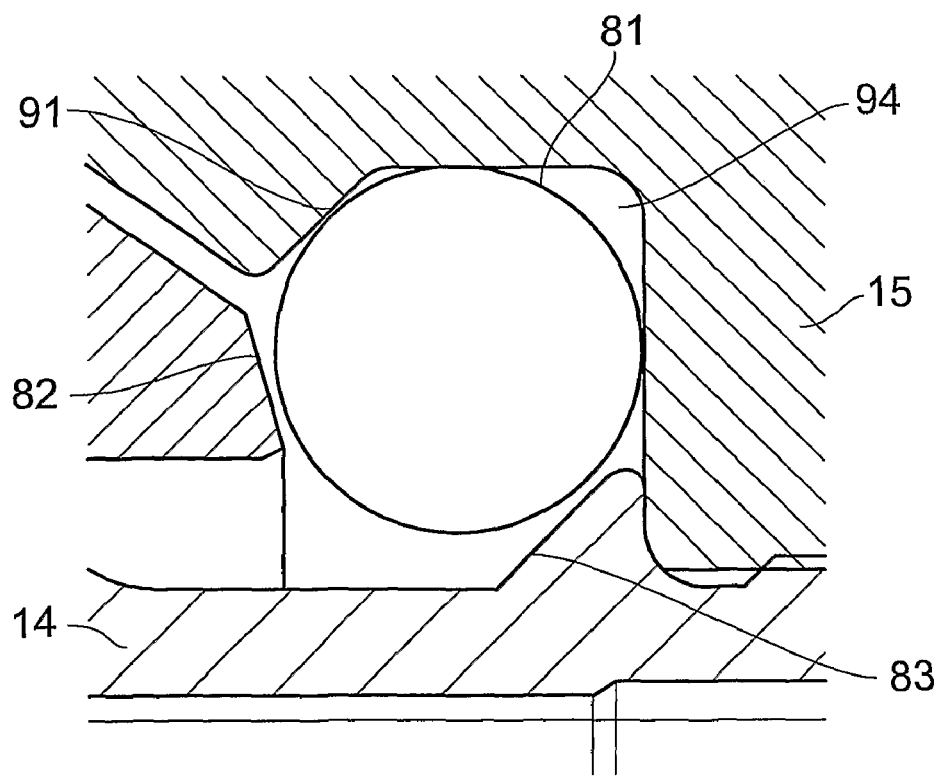
FIG. 6B corresponds to FIG. 6A and shows an enlarged part cross section, showing the shut-off elastomer in its dynamic condition.

As the equipment starts, and the shaft 12 rotates, the elastomer 81 is subjected to centrifugal forces, which act in a radial outwardly manner. The centrifugal forces allow the elastomer 81 to lift from the inclined stator surface 82 and move onto the rotor inclined surface 91. This is shown in FIG. 6B.

The inclined surface 91 on the rotor then converts the substantially radial movement of elastomer 81 into a radial and axial movement pushing it towards rotor void 94.

As the equipment shaft 12 stops, the outwardly directed centrifugal forces acting on the elastomer 81 also stop. The natural elasticity of the elastomer 81 then creates inwardly directed radial forces which urge the elastomer 81 to return back into its v-shaped seating surfaces 82 and 83 of the respective stator 17 and rotor 14, as shown in FIG. 6A.

The elastomer 81 in the v-shaped seating surfaces 82 and 83, provides a radial shut-off device and creates a static seal preventing the passage of fluid or solids from either the atmospheric to product substance side, or product to atmospheric substance side.

The radial gap 92 could be of any size. By way of example it could be from zero to 2.000" or 50 mm and above. It is preferred that said radial gap is approximately 0.010". Furthermore, in some applications it may be deemed necessary for the inclined surface 91 to radially inwardly compress elastomer 81, therefore the "radial gap" is then an interference fit offering frictional resistance between rotor surfaces 91 and 83.

The above described arrangement does not possess any of the limitations of U.S. Pat. No. 5,378,000 (Orlowski). These are addressed below;

The v-seating configuration of the invention ensures the elastomer 81 is not in contact with acute or knife-edge surfaces which can rip into the elastomer 81 during equipment start-up and shutdown conditions.

The v-seating configuration of the invention ensures that any and all elastomer 81 manufacturing tolerances do not impact on the design whatsoever. In a static condition, the frictional resistance of the elastomer 81 to surfaces 82 and 83 is somewhat constant irrespective of the cross sectional size of the elastomer 81. All elastomer 81 cross sectional size variance is accommodated by the rotor gap 92 and/or rotor void 94.

The v-seating configuration of the invention accommodates any slight axial displacement of the respective rotor 60 and stator 17 components, which may occur during installation of the invention onto the shaft. Should the respective axial nominal gap between the rotor 60 and stator 17 change, the v-seating configuration will axially open or close accordingly, since it comprises two independent surfaces. The effect that this has on the elastomer 81 is that the nominal radial sealing position of said elastomer 81 will change slightly. The elastomer 81 will be seated at a slightly higher radial position than nominal if the axial gap closes, or a slightly lower radial position than nominal if the axial gap increases. This design thereby ensures that the elastomer 81 is not placed under any undesired stresses and/or shear forces as a result of axial movement.

Figure 4A:
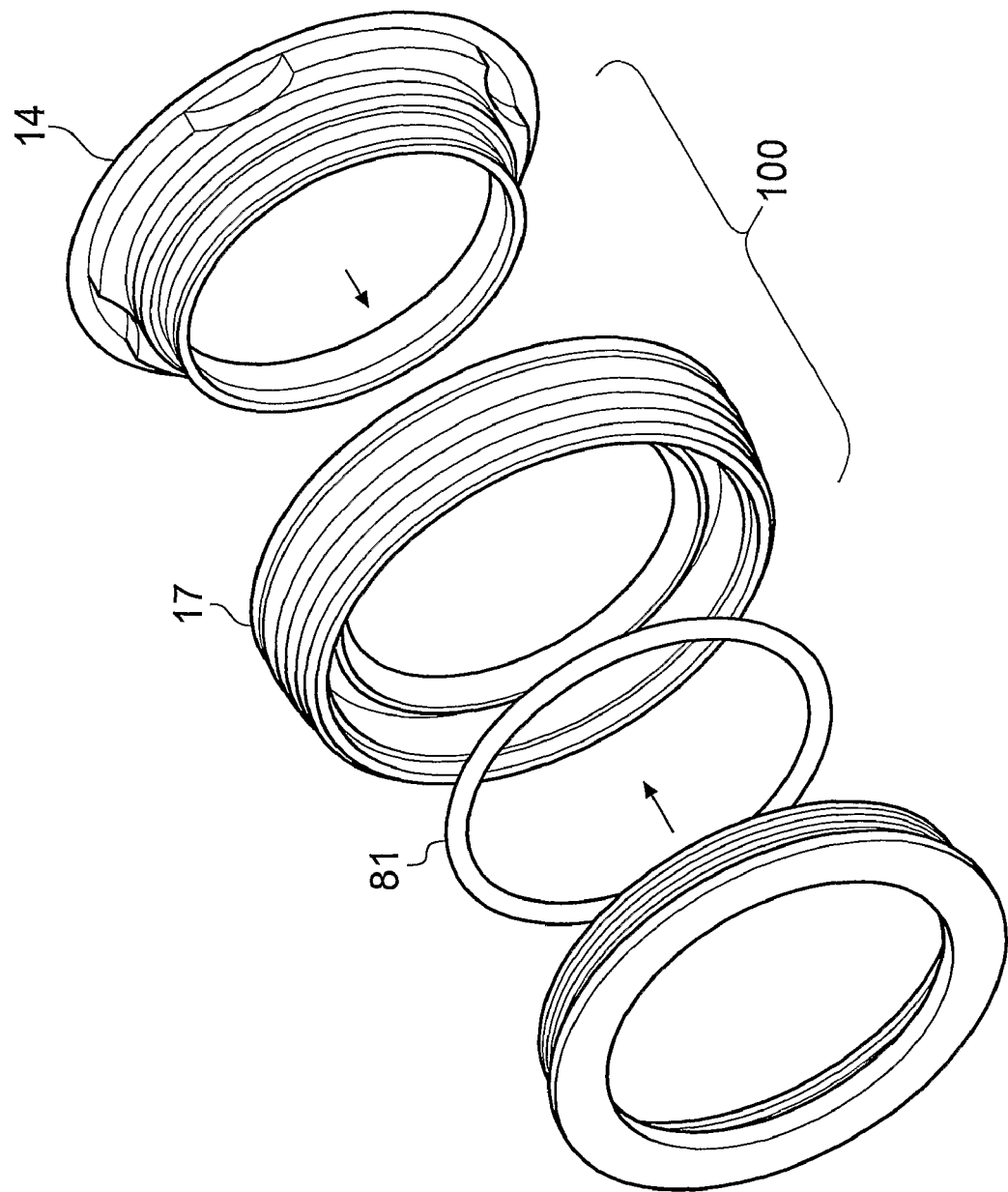
FIG. 4A corresponds to FIG. 1 and shows an isometric exploded view.
Figure 4B:
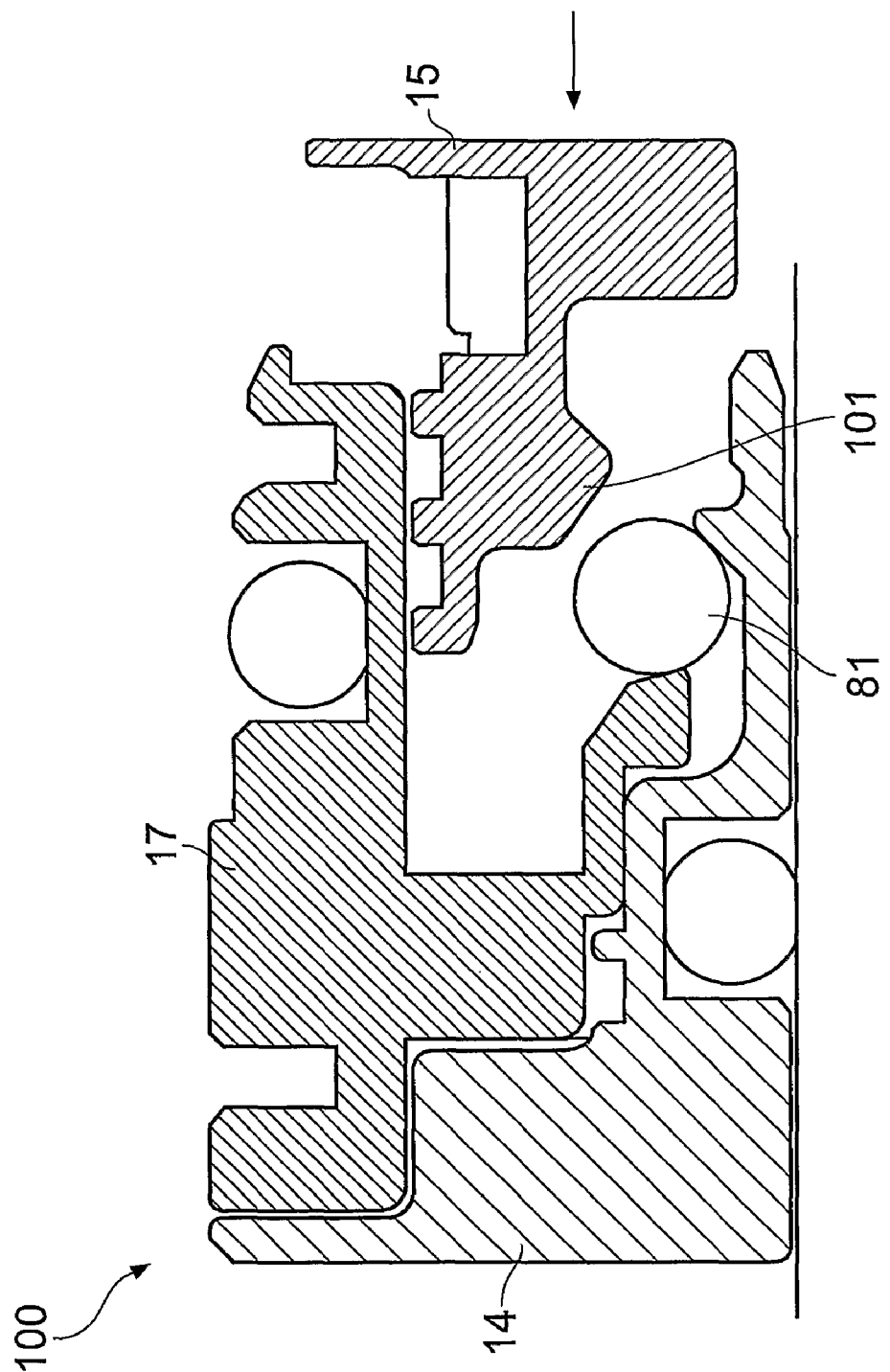
FIG. 4B corresponds to FIG. 1 and shows a part section exploded view.

FIG. 4A is an exploded isometric view of four of the six constituent components of the bearing protector of FIG. 1. During assembly of the invention, rotor 14 is pushed through stator 17 until it axially locates. Elastomer 81 is radially and outwardly stretched and placed in the resulting v-seating area, created by the rotor 14 and stator 17 subassembly 100. FIG. 4B illustrates this. As rotor 15 is axially offered to subassembly 100, radially inclined surface 101 radially locates on elastomer 81. Continued axial movement of rotor 15 causes the inclined surface 101 to radially compress the solid deformable elastomer 81 without damage. The inclined surface 101 is therefore highly desirable.

Figure 5:
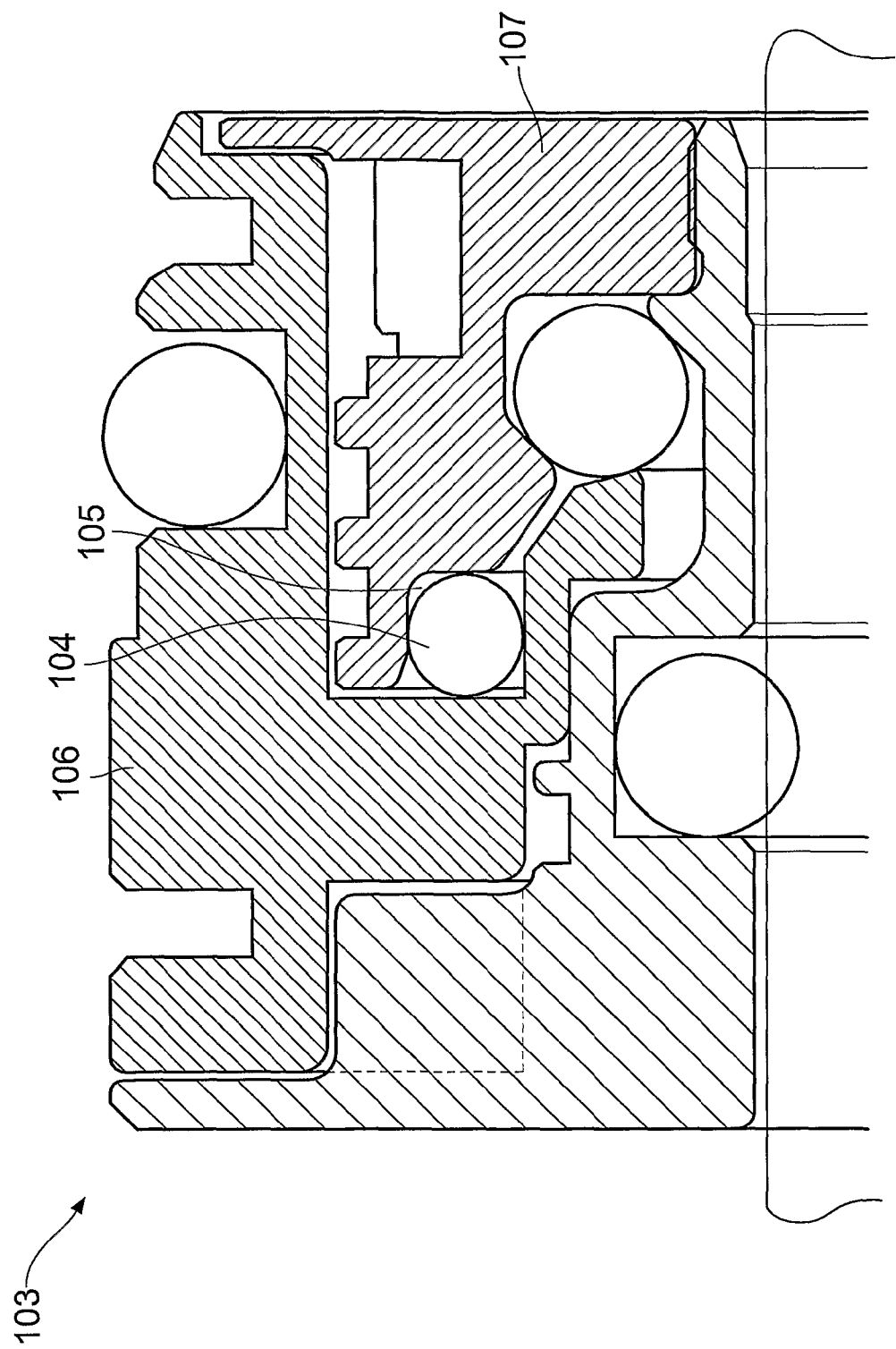
FIG. 5 corresponds to FIG. 3 and shows an enlarged part longitudinal cross section.

FIG. 5 corresponds to FIG. 3 and shows a partial longitudinal cross section of a bearing protector 103 incorporating an additional solid deformable member or elastomer 104. Elastomer 104 is mounted in a captured radial cavity 105 between two counter-rotating surfaces—the stator 106 and the rotor 107. Said elastomer 104 helps to restrict the volumetric flow of air-born molecules passing through the invention. Further supply advantages are gained as this embodiment is compatible with the FIG. 1 embodiment and therefore the addition of elastomer 104 does not necessitate changes to the components of the first embodiment.

Figure 7:
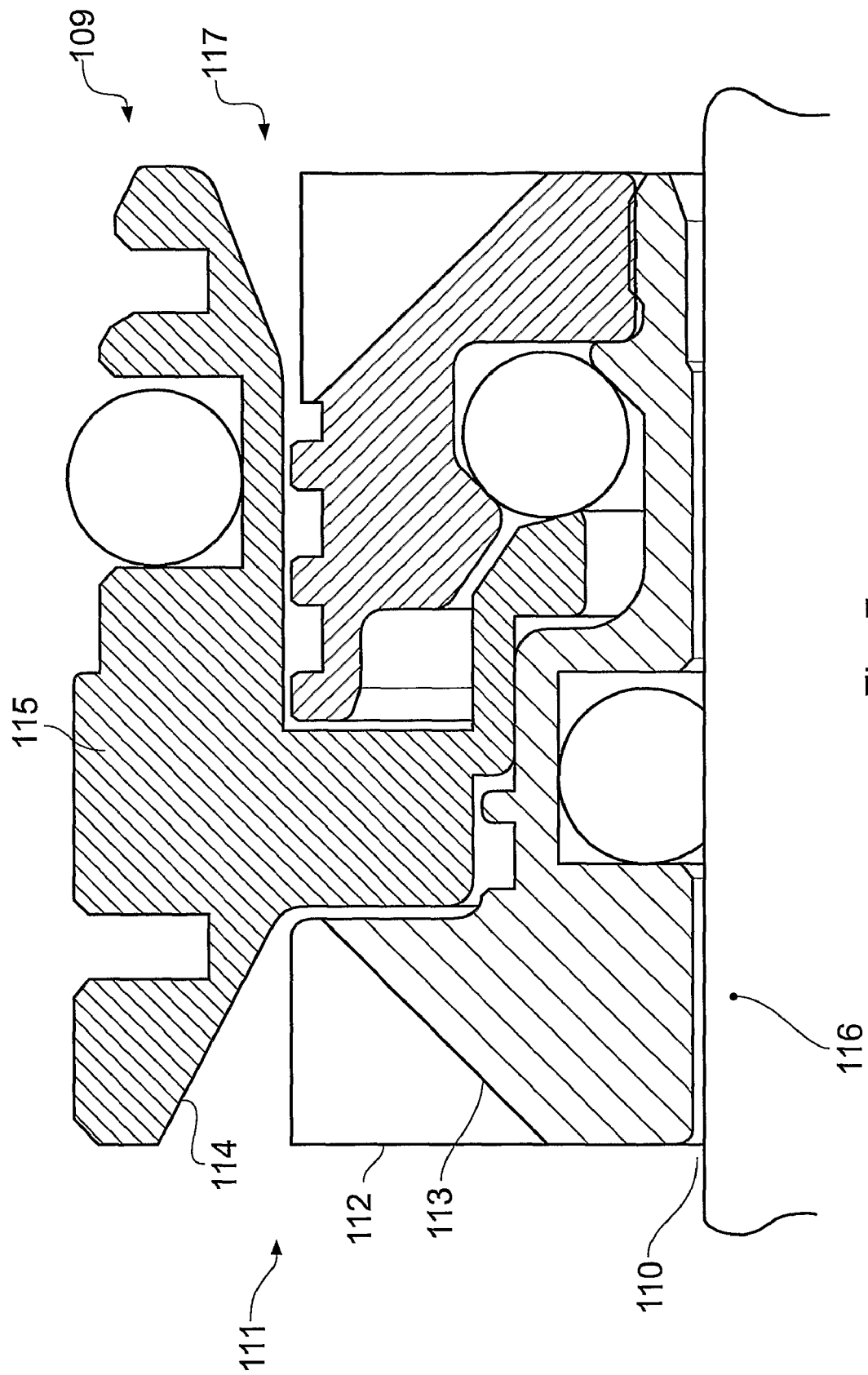
FIG. 7 shows a part longitudinal cross section of another embodiment of the invention.

FIG. 7 shows a part longitudinal cross section of another embodiment of the invention. Bearing protector 109 has a rotor assembly 110 containing at least one repelling pumping device 111 comprising at least one radially extending feature 112 with an inclined radial root 113, positioned on the outermost circumference of said rotor assembly 110. Said radially extending feature 112 is adjacent to a substantially radially inclined inner surface 114 of the stator 115.

As the rotor assembly 110 rotates with shaft 116, the radial extending feature 112, in particular in radially inclined root 113, radially displaces atmospheric substance towards the inner inclined surface 114 of the stator 115. The atmospheric substance is also displaced radially outwards by the centrifugal forces created by the rotation of the rotor assembly 110. Once the atmospheric substance connects with the inclined surface 114 of stator 115, its radial velocity is converted to an axial displacement as the substance is thrown away from the bearing protector 109.

As shown in FIG. 7, the rotor assembly 110 contains at least two repelling pumping devices 111 and 117, which are axially displaced. Each repelling pumping device comprises of at least one radially inwardly extending feature positioned on the circumference of said rotor adjacent to a substantially radially inclined inner surface of the stator 115.

While FIG. 7 shows an inclined root 113 of the radial inwardly extending feature 112, the profile of root 113 could be any combination of inclined, parallel or curved surfaces, including but not limited to, convex, concave and parallel in both the longitudinal section and end view, or any combination thereof.

Figure 8:
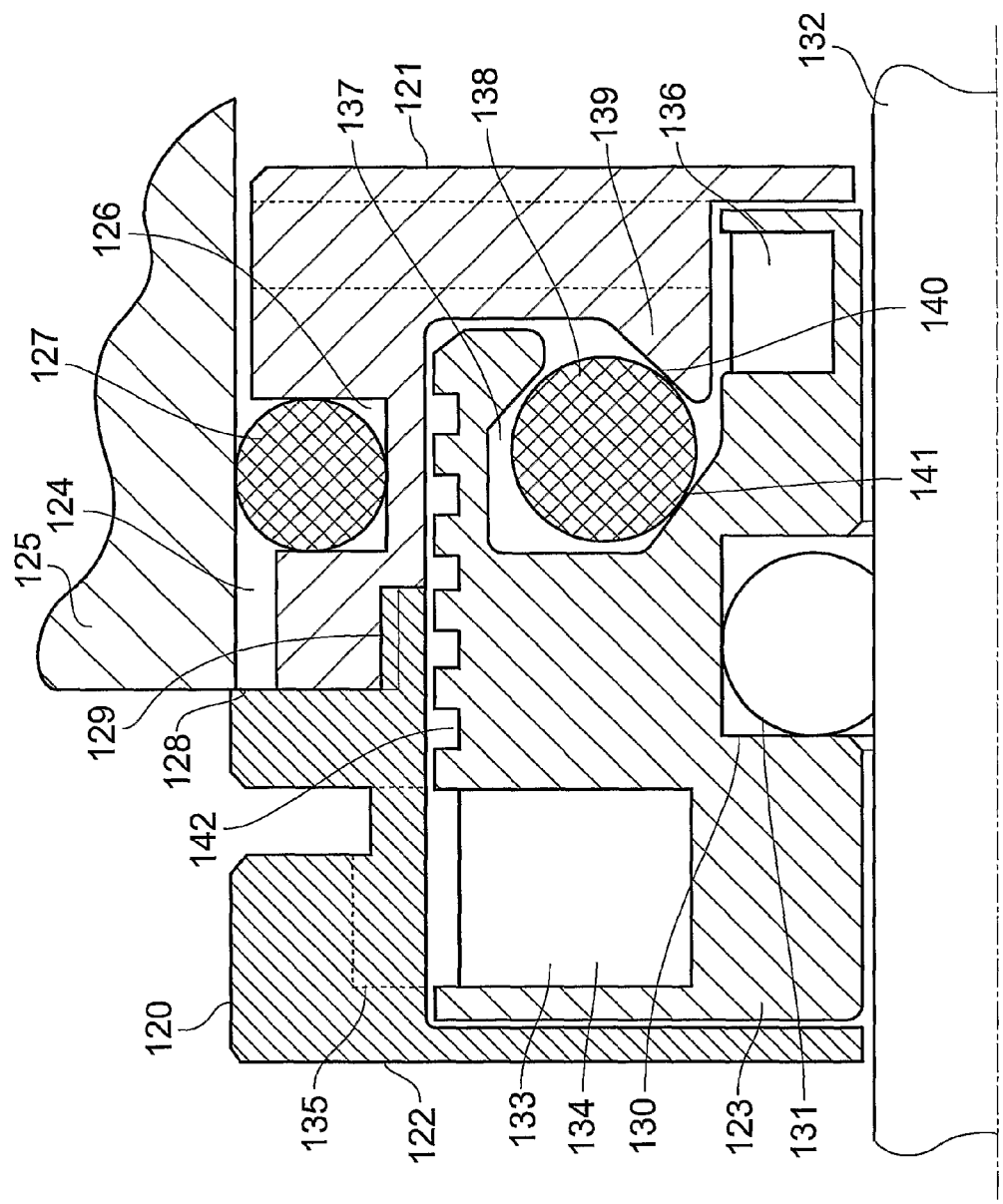
FIG. 8 shows a part longitudinal cross section of another embodiment of the invention.

Referring to FIG. 8 stator assembly 120 comprises two, axially joined stator members 121 and 122 which are radially located and axially abut. Said stator assembly 120 consists of two radially inwardly extending members which axially capture the rotor 123, which is preferably a monolithic item.

Stator number 121, adjacent to the radial abutment of the two stators 122 and 121, incorporates a radial inwardly extending feature 124, on its outermost radial surface. Said radial extending feature 124 acts as an under cut to ensure the stator assembly 120 does not overly radially interfere with the equipment housing 125 given the radial location between the two stators 122 and 121.

Stator member, 121 includes a radially inwardly extending recess 126 from its outermost surface, which carries a solid deformable elastomeric member 127 which provides a circumferential seal to the innermost surface of equipment housing 125.

Stator member 122 has a radially outwardly extending feature 128, which axially positions the stator assembly 120 to the end surface of equipment housing 125.

Stators 122 and 121 are joined at 129 by mechanical means such as a radial interference fit or a screw thread. However, chemical means such as adhesive and/or permanent means such as welding are further examples of a suitable fixing methods.

Rotor 123 includes a radially outwardly extending feature 130 from its innermost surface, which carries a solid deformable elastomeric member 131 which provides a circumferential seal to the outermost surface of equipment shaft 132.

Rotor 123 has at least one repelling pumping feature 133, which comprises at least one radial extending feature, namely, slot 134 on the outermost circumference of rotor 123.

Slot 134 and rotor 123 operate in a cavity of stator 122. This cavity is preferably eccentric as described above with reference to FIG. 2A.

Furthermore, stator 122 incorporates at least one drainage orifice 135 as described above with reference to FIG. 2B.

Rotor 123 contains at least two repelling pumping devices 133 and 136, which are axially displaced. Each repelling pumping device comprises of at least one radially inwardly extending feature positioned on the circumference of said rotor adjacent to an eccentric pumping cavity on the inner surface of the stators 121 and 122.

Rotor 123 contains a shut-off arrangement 137 containing elastomer 138 operating in a v-shaped seating area 139 comprising an inclined stator radial surface 140 and an inclined rotor radial surface 141.

Rotor 123 also has at least one radial extending castellation feature 142, which is in close radial proximity to the inner radial surface of stator 122 and/or 121.

Figure 9A:
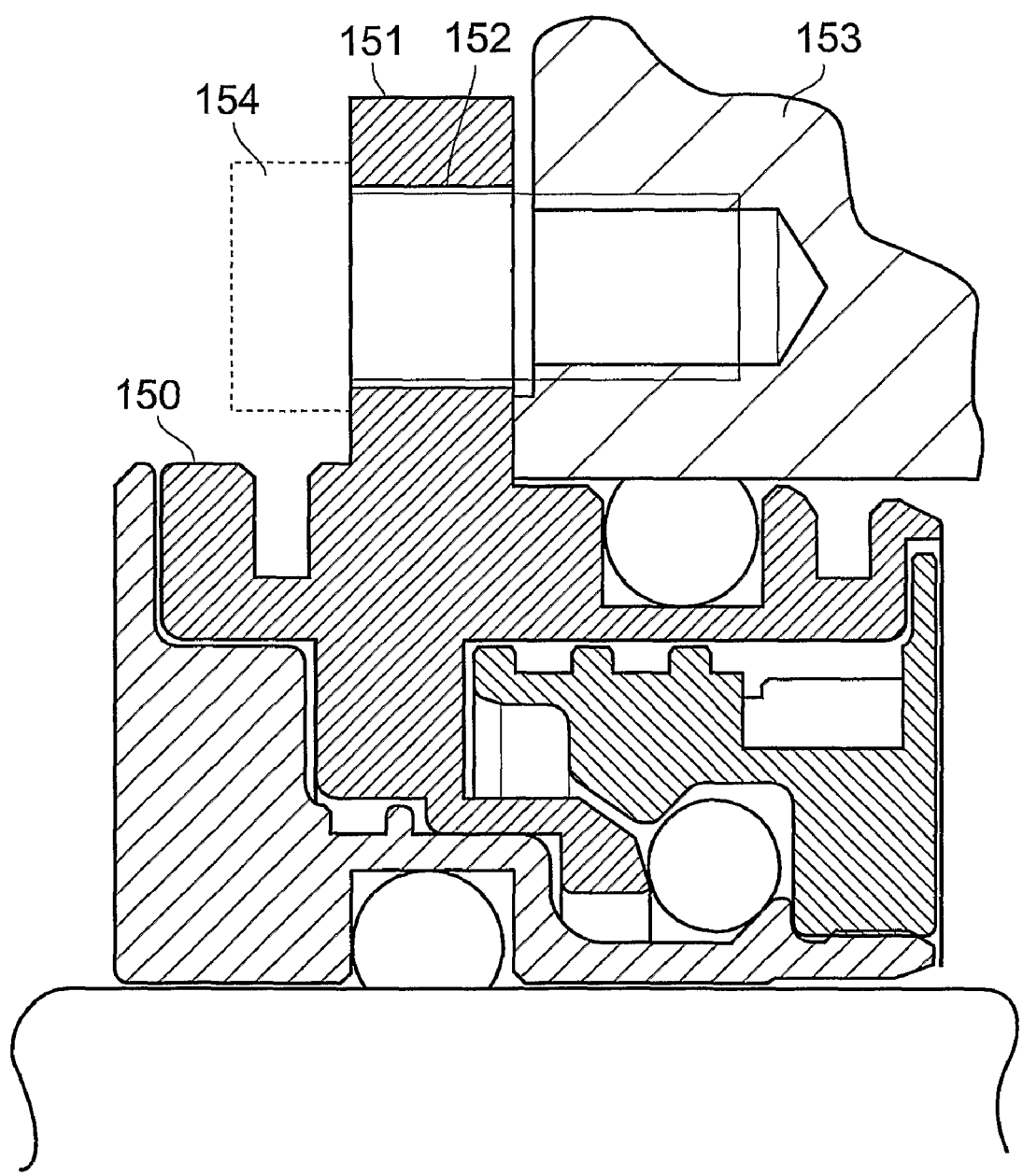
FIG. 9A shows a part longitudinal cross section of another embodiment of the invention.

Referring to FIG. 9A, a seal of the invention may include a stator housing 150 having a radially outwardly extending feature 151. In said feature 151, stator 150 contains at least one axial through hole or slot 152 for accommodating a stud or bolt 154 in an item of rotating equipment 153, thereby allowing the stator 150 of the invention to be mechanically and positively secured to the rotating equipment 153.

Figure 9B:
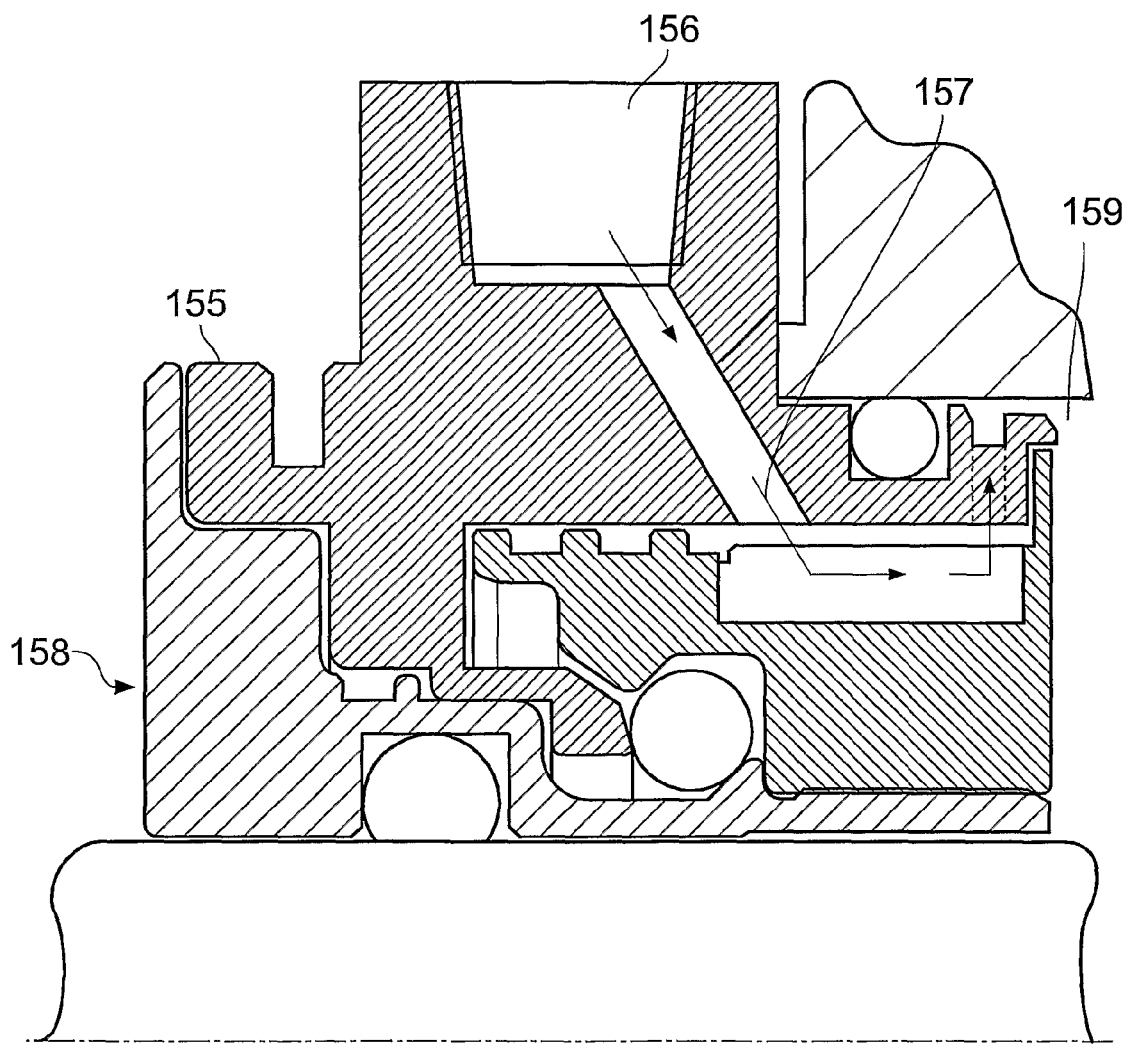
FIG. 9B shows a part longitudinal cross section of the embodiment of FIG. 9A, showing an environmental connection in the stator.

As shown in FIG. 9B, such a stator housing 155 also incorporates an environmental connection 156 to inject or flush a primary or secondary fluid 157 into the seal 158, which then pumps it into the process cavity 159.

Figure 10:
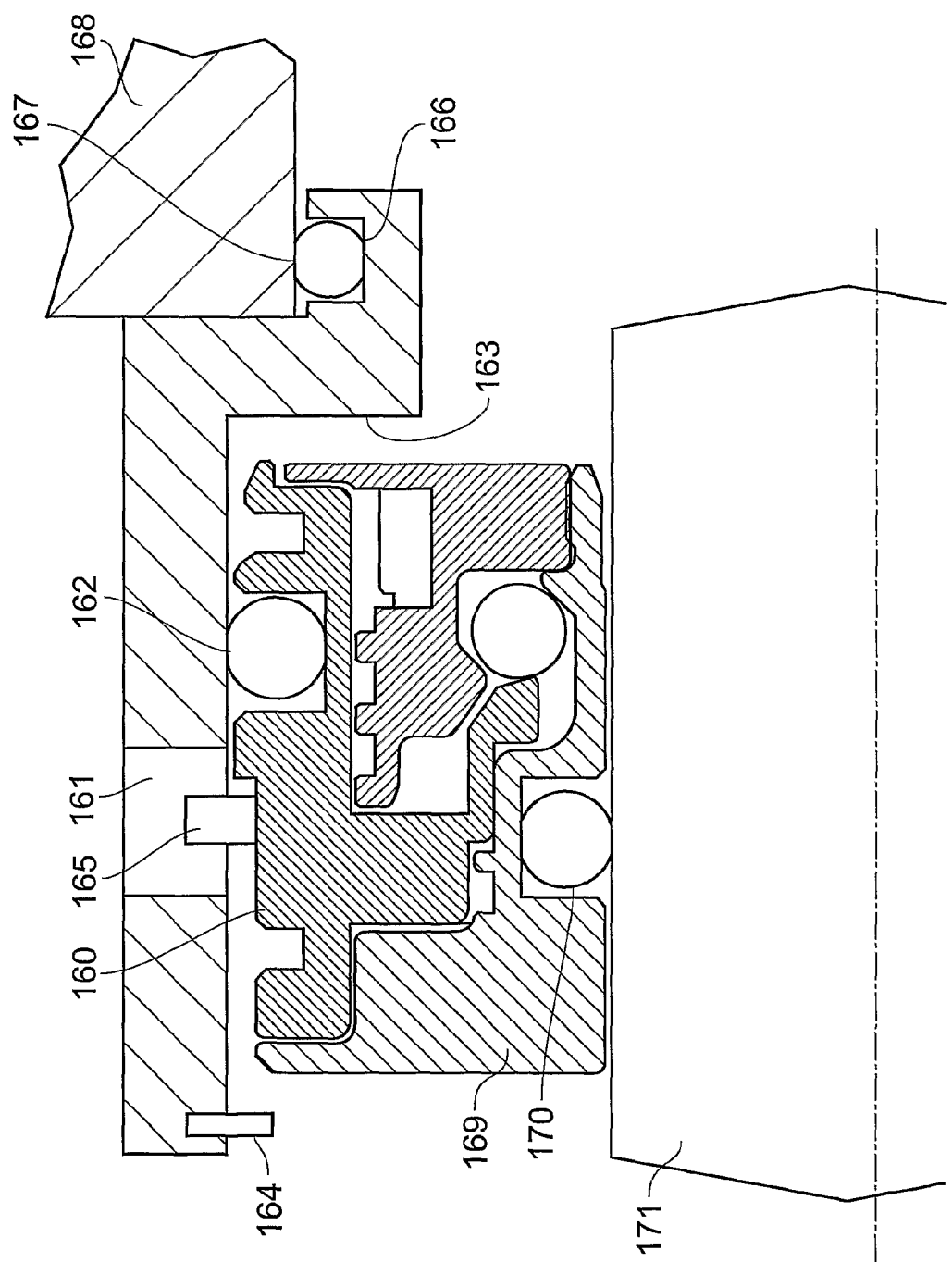
FIG. 10 shows a part longitudinal cross section of another embodiment of the invention.

Referring to FIG. 10, a seal of the invention may include two axially sliding stator housings 160 and 161. One stator housing 160 is radially inward of the second stator housing 161 and at least one of the stators incorporate an axially sliding elastomeric member 162 which circumferentially seals between the two housings 160 and 161.

Preferably, the axial movement between the two stator housings is positively restricted by a radially extending feature 163 and/or 164. Preferably, both stator housings 160 and 161 are positively rotationally connected, via an appropriate mechanical means such as a drive pin or drive lug 165, which allows axial movement of the two stators but restricts rotational movement.

Said outer stator housing 161 incorporates a radially extending feature 166, which houses an elastomeric member 167. Said elastomeric member 167 provides a circumferential seal between said stator housing 161 and the equipment housing 168.

Rotor 169, includes an elastomer 170, which circumferentially seals the rotor 169 to the equipment shaft 171.

The other elements of the invention illustrated in FIG. 10 have been previously described with reference to other embodiments.

Said axially sliding elastomeric member 162, preferably has a lesser radial compression, hence less frictional resistance, than the outer stator elastomer 167 and shaft elastomer 170. This lesser frictional resistance thereby encourages axial movement to take place at this elastomer 162 rather than at the other positions within the seal.

The FIG. 10 embodiment therefore provides an arrangement which can accommodate axial longitudinal displacement between the equipment shaft 171 and the equipment housing 168. This axial displacement is encouraged to take place at the position of the less frictional resistance elastomer 162, rather than at the shaft elastomer 170. This ensures the respective running clearances between the rotor 169 and inner stator 160 are substantially maintained and not compromised. Any amount of movement between axial equipment shaft 171 and equipment housing 168 movement can be accommodated.

Figure 11A:
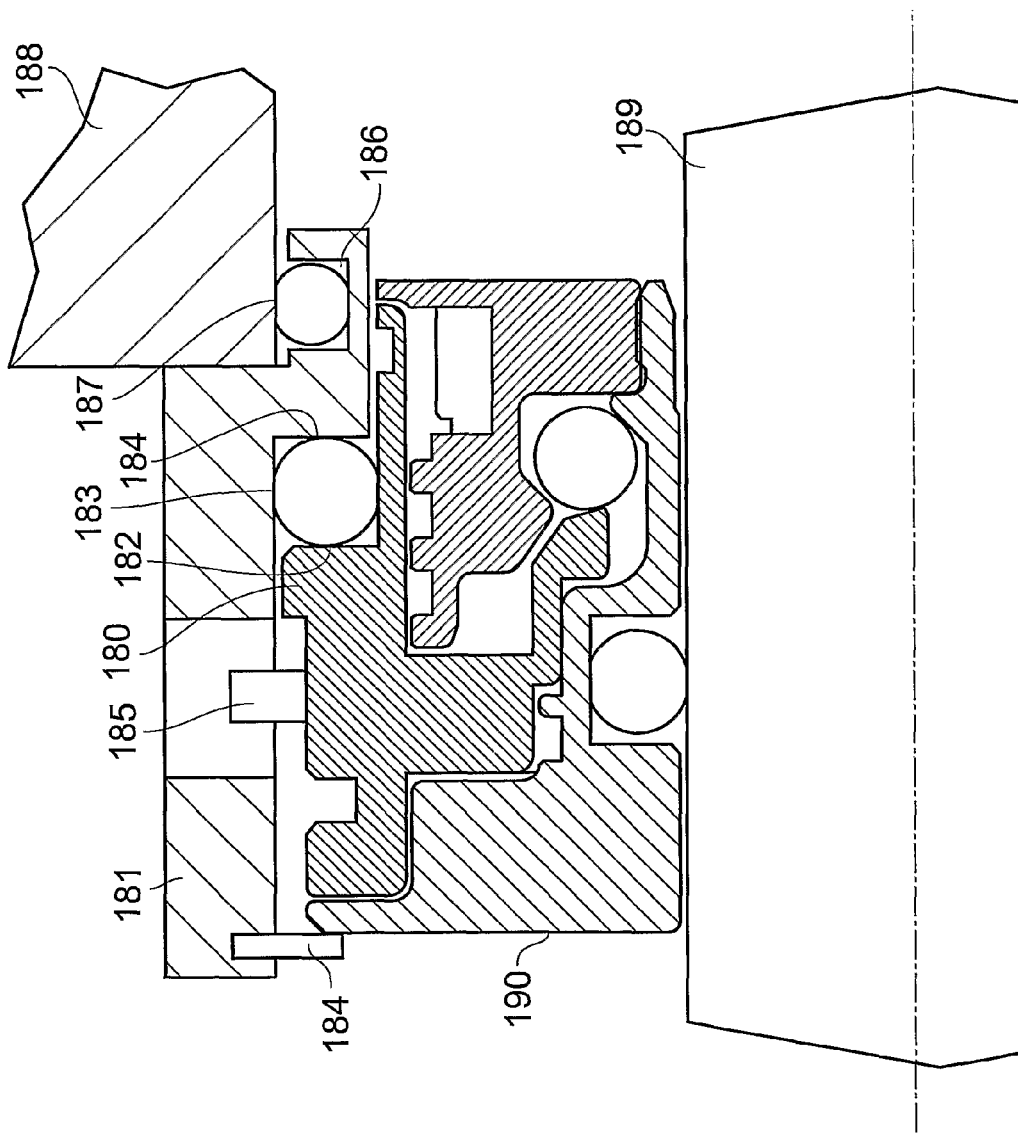
FIG. 11A shows a part longitudinal cross section of another embodiment of the invention.

Referring to FIG. 11A, a seal of the invention includes two angularly sliding stator housings 180 and 181. One stator housing 180 is radially inward of the second stator housing 181 and includes a radially extending feature 182. Said feature 182 axially abuts angular sliding elastomer 183. The outer stator housing 181 also includes a radially extending feature 184, which axially abuts the opposite axial side of the angular sliding elastomer 183. The angular sliding elastomer circumferentially seals between the two housings 180 and 181.

The axial movement between the two stator housings 180 and 181 is positively restricted by a radially extending feature 184.

Both stator housings 180 and 181 are positively rotationally connected, via an appropriate mechanical means such as a drive pin or drive lug 185, which allows angular movement of the two stators 180 and 181 but restricts rotational movement.

Outer stator housing 181 incorporates a radially extending feature 186, which houses an elastomeric member 187. Said elastomeric member 187 provides a circumferential seal between said stator housing 181 and the equipment housing 188.

Figure 11B:
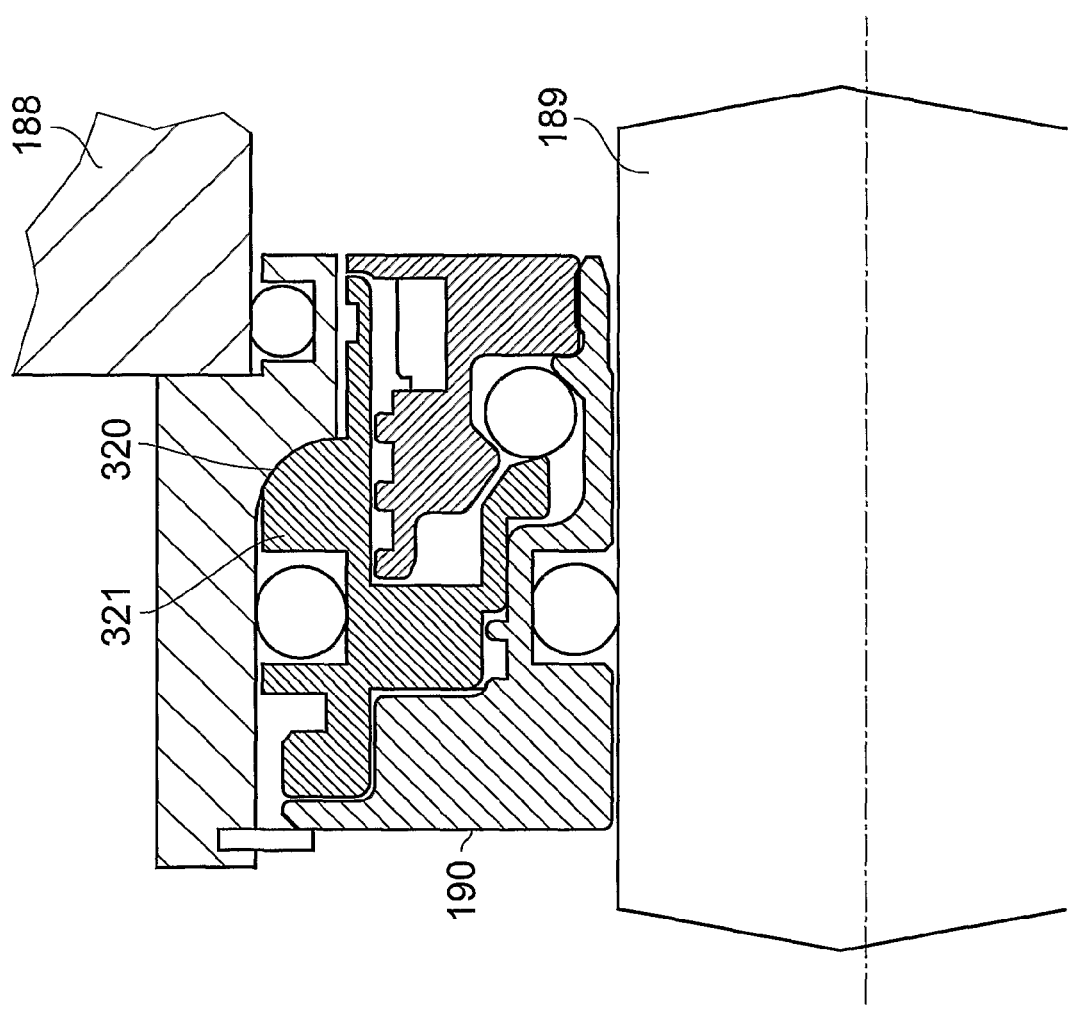
FIG. 11B shows a part longitudinal cross section of another embodiment of the invention.

Alternatively, said angular movement could be accommodated by two mating spherical surfaces 320, or mechanical alternative, as shown in FIG. 11B The other elements of the invention illustrated in FIG. 11 have been previously described with reference to other embodiments.

The embodiments of FIGS. 11A and 11B therefore provide arrangements which can accommodate angular displacement between the equipment shaft 189 and the equipment housing 188. This angular displacement is encouraged to take place at the pivot position between the two stators 180 and 181, at elastomer 183 or spherical joint 320 rather than at other positions. This ensures the respective running clearances between the rotor 190 and inner stator 180/321 are substantially maintained and not compromised in an equipment application containing angular displacement between the shaft 189 and equipment housing 188.

Figure 12A:
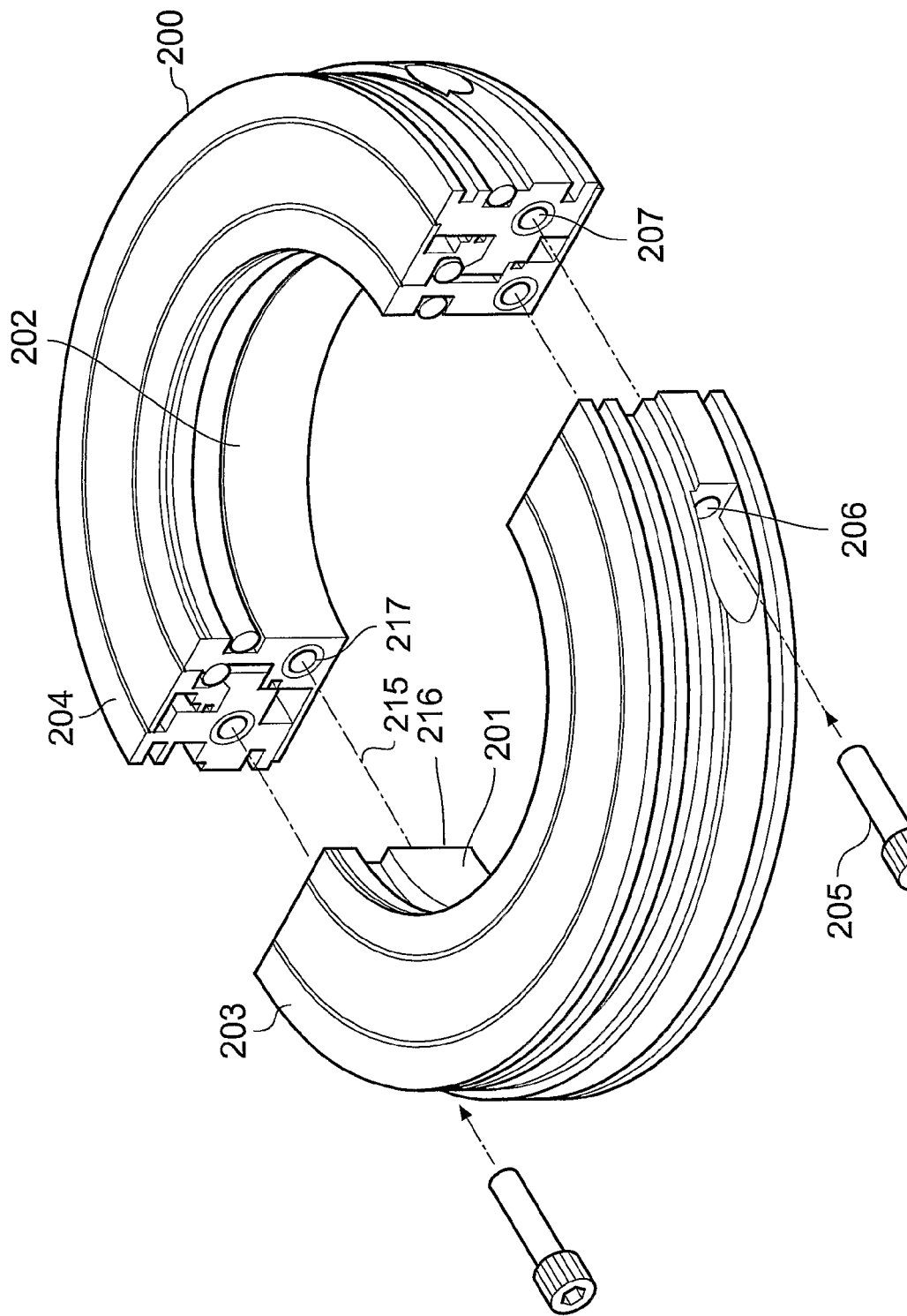
FIG. 12A shows an isometric view of another embodiment of the invention which is a longitudinally split labyrinth seal.

Referring to FIG. 12A, seal 200 is substantially split across its longitudinal axis for ease of installation of equipment, which can not be disassembled in the conventional manner to allow a conventional seal to be installed.

The seal incorporates at least two longitudinally and substantially mating split rotor assembly halves 201 and 202 and at least two longitudinally and substantially mating split stator halves 203 and 204. The features of this seal, particularly the shut-off device and the repelling pumping device, have been previously discussed above.

The specific split feature of this embodiment will be herewith described with further reference to FIGS. 12A, 12B, 12C, 12D, 12E, 12F, and 12G.

From FIG. 12A, the two split halves of the stator are connected together by a suitable securing device, such as one or more cap screws 205. Capscrew 205 operates in a clearance hole 206 in one of the split stator halves 203, and engages in a corresponding threaded hole 207 in the second split stator 204.

The capscrew 205 securing method is by way of example only. In a further example, both split stator halves incorporate clearance holes allowing a bolt to be passed through both and secured by the use of a nut onto the bolt.

Figure 12B:
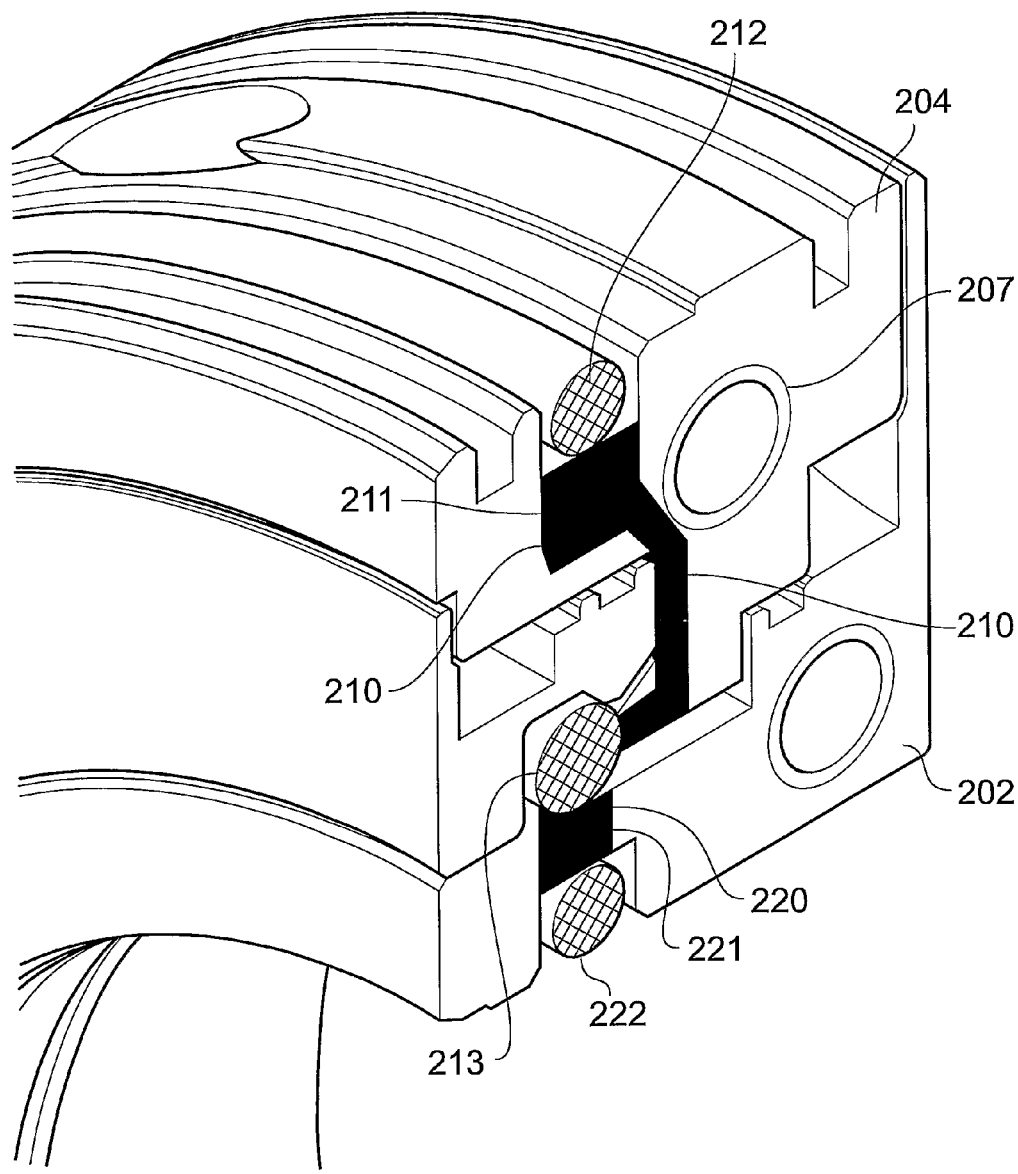
FIG. 12B shows an enlarged isometric view on the axially split end of the embodiment of FIG. 12A.

From FIG. 12B, the two split stator halves 203 and 204 have a suitable sealing device 210 positioned on the radial ends, between the two, before they are secured together. Said sealing device 210 could be a sealant dispensed at the time of installation to the equipment, or a gasket type member as shown. The gasket type member could cover the full radial end of the stator 204, or, as shown in FIG. 12B, it is of defined shape.

From FIG. 12B, gasket 210 sits in a channel 211 in at least two radial ends of either stator 203 or 204 half. Gasket 210 provides a radially extending seal between the stator to equipment housing elastomer 212 and the stator to rotor elastomer 213. Preferably, the gasket 210 abuts to each elastomer 212 and 213.

From FIG. 12A, the two split halves of the rotor assembly 201 and 202 are connected together by a suitable securing device, such as one or more cap screws 215. Capscrew 215 operates in a clearance hole 216 in one of the split rotor halves 201, and engages in a corresponding threaded hole 217 in the second split rotor 202.

Alternatively, both split stator halves could incorporate clearance holes allowing a bolt to be passed through both and secured by the use of a nut onto the bolt.

From FIG. 12B, the two split rotor halves 201 and 202 have a suitable sealing device 220 positioned on the radial ends, between the two, before they are secured together. Again, said sealing device 220 could be a sealant dispensed at the time of installation to the equipment, or a gasket type member as shown. The gasket type 220 member could cover the full radial end of the rotor 202, or, as shown in FIG. 12B, it is of defined shape.

From FIG. 12B, gasket 220 sits in a channel 221 in at least two radial ends of either rotor 201 or 202 half. Gasket 220 provides a radially extending seal between the rotor to equipment shaft elastomer 222 and the rotor to stator elastomer 213. Preferably, the gasket 220 abuts to each elastomer 222 and 213.

The two split halves of either rotor and stator could be lapped together so that they are flat and thus form an integral sealing surface. This removes the need for a gasket between said halves. However, the additional engineering required to make a sealable joint between two metallic parts is greater than if a solid deformable material is used.

Furthermore, the two halves of the respective bearing protector components could be glued together with a suitable adhesive and/or sealant, during the installation of the unit on the rotating piece of equipment.

Also, the two halves of the stator and rotor could be mechanically secured and held together by a suitable means such as a jubilee clip, circlip, split ring, and/or tie-wrap.

Figure 12C:
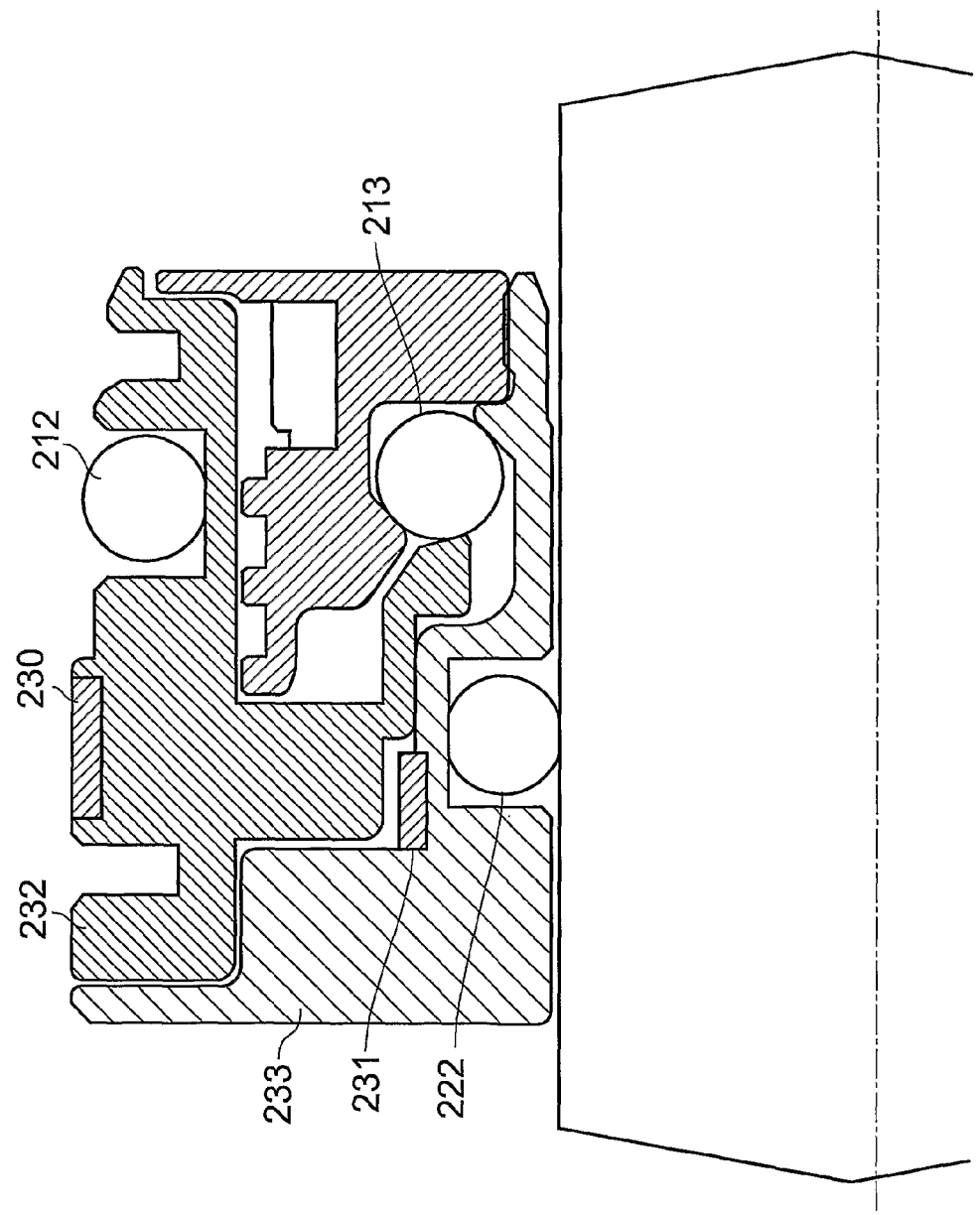
FIG. 12C shows a partial longitudinal cross section of the embodiment of FIG. 12A, containing circular securing straps.

Referring to FIG. 12C, a further embodiment of a seal of the invention incorporates a strap-type 230 and 231 securing device for both the stator 232 and rotor 233, to secure the two respective split halves together. This necessitates split elastomeric members 212, 213 and 222, prior to the installation of the invention onto the equipment. Elastomers 212, 213 and 222 could be radially split, using for example a knife and after they are wrapped around the shaft, the ends of said elastomers 212, 213 and 222 secured via the appropriate adhesive making a continuous circular ring.

Figure 12D:
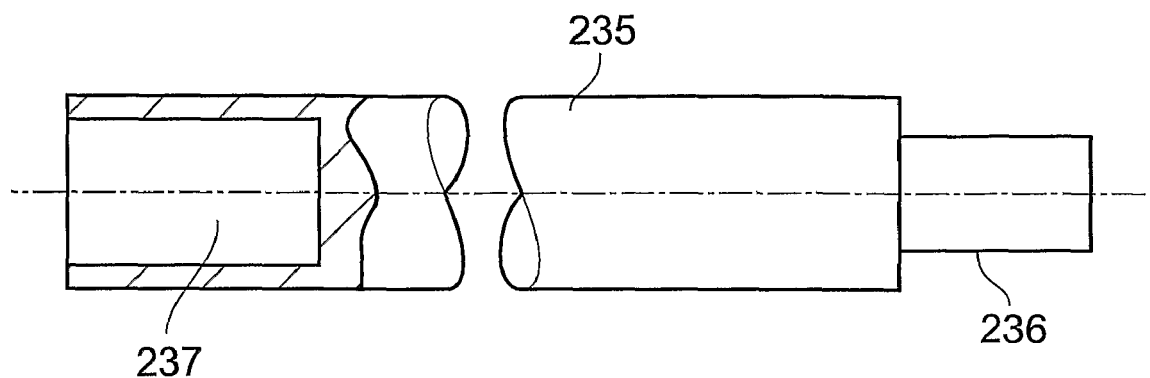
FIG. 12D shows a partial longitudinal cross section of a split elastomer of the embodiment of FIG. 12A.

Since the ends of the elastomer are prone to being secured together in a radial offset manner which could effect the sealing performance, the split elastomer includes a positive location between its respective ends as shown in FIG. 12D.

From FIG. 12D, one end of the split elastomer 235 contains a radially inward extended member 236 and the other end of the split elastomer 235 contains a corresponding location hole 237. During assembly around the equipment shaft, the extended elastomer end 236 is located and secured with an appropriate adhesive, into the elastomer end with the hole 237. This design ensures an accurate radial location between both ends of the elastomer 235 and is therefore desirable to ease installation.

In some applications, the use of screws connected two axially split components together can be difficult, and it is advantageous if said screws could be held captive in said split parts whilst installing the seal in difficult to access areas.

As described above, one method of securing the two radial halves together with the use of screws in clearance and threaded location holes 216 and 217. However, said location holes in both halves of the rotor and stator could be threaded. In such a case a special screw is used as shown in FIG. 12E.

Figure 12E:
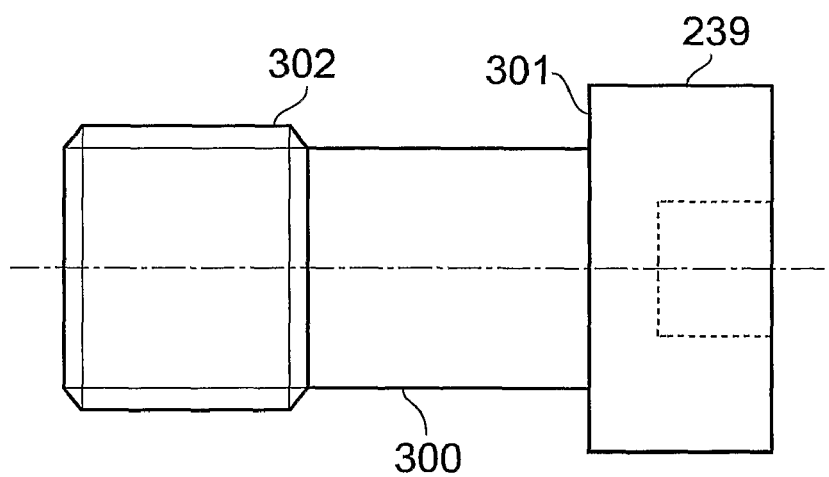
FIG. 12E shows a partial longitudinal cross section of another embodiment of the invention, showing a screw of the invention.

From FIG. 12E, the capscrew 239 has a radially inwardly extending recess 300 over a limited axial length, which extends between the head 301 of the screw to the threaded portion 302.

Figure 12F:
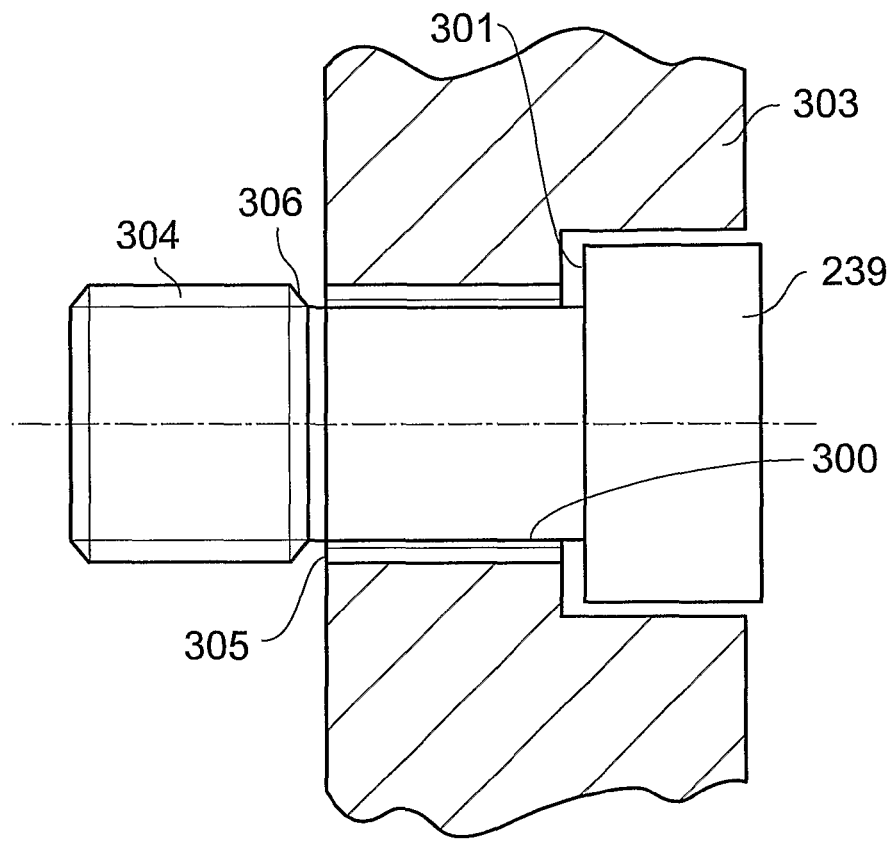
FIG. 12F shows a partial cross sectional end view of part of another embodiment of the invention, showing a screw of use in the invention in an un-secured situ in the axially split assembly.

From FIG. 12F, capscrew 239 is screwed into a threaded location hole in one of the axially split rotor members 303 until thread 304 on capscrew 239 clears the axial end of the corresponding thread 305 in the rotor 303. The radially inwardly extending recess 300 of the capscrew 239 has an outer surface, which is radially smaller than the inner surface of the thread 305 in rotor 303. Capscrew 239 is now axially captured between shoulders 301 and 306 in the axially split rotor 303 and cannot be dislodged during installation of the split sealing device.

Figure 12G:
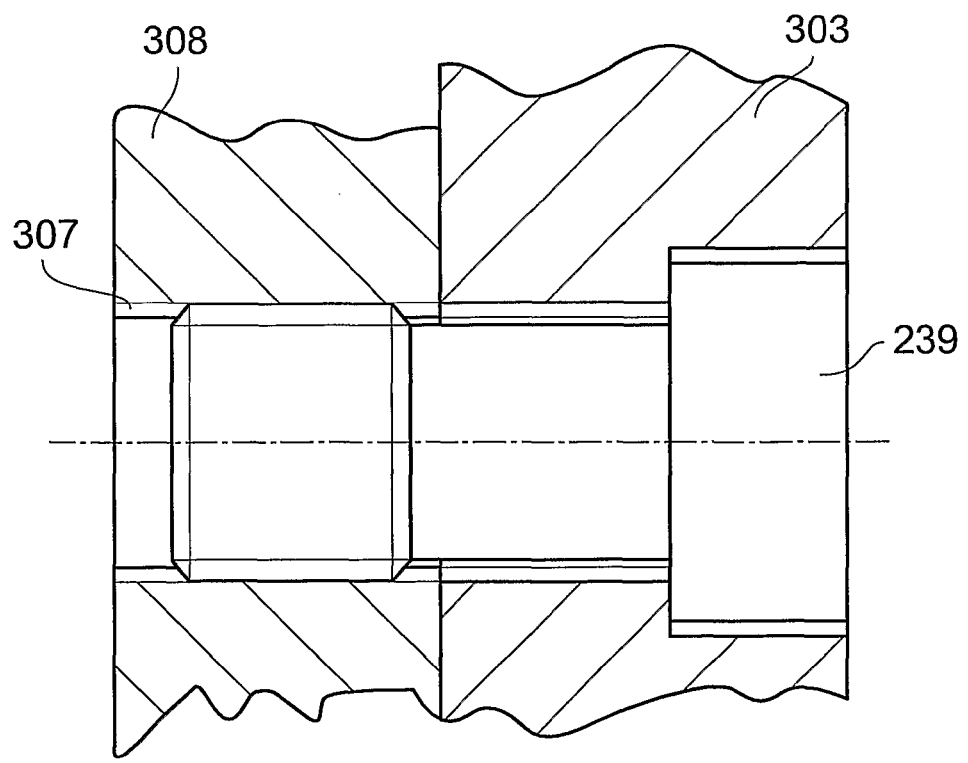
FIG. 12G shows a partial cross sectional end view of the embodiment of FIG. 12F embodiment of the invention, showing a screw of the invention in secured situ in the axially split assembly.

FIG. 12G shows the corresponding thread 307 in the corresponding rotor half 308 and the capscrew 239 in a secured position, clamping both radially the split rotor halves 303 and 308 together.

The same captured capscrew securing method may also be utilised in securing the stator.

Figure 13:
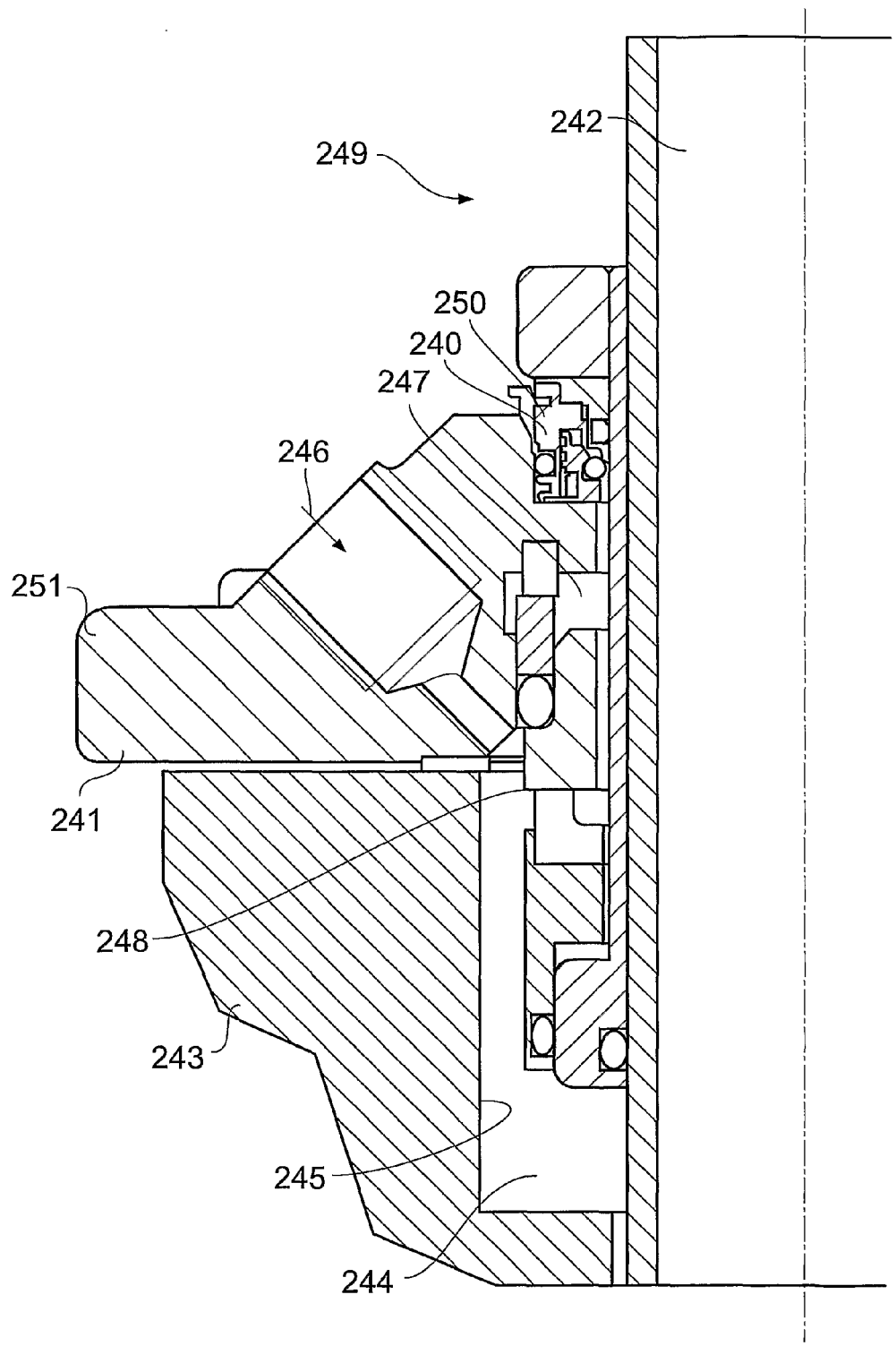
FIG. 13 shows another embodiment of the invention in the form of a bearing seal fitted to the outboard end of a cartridge seal.

Referring to FIG. 13, the cartridge mechanical seal 241 is installed on a shaft 242 and secured to a housing 243 of a piece of rotating equipment. The cartridge mechanical seal 241 prevents the leakage of the process substance 244 from escaping the process chamber 245.

FIG. 13 shows a seal 240 on the non-process substance side of the cartridge mechanical seal 241. The mechanical seal 241 contains barrier fluid 246 in the barrier chamber 247. The barrier fluid 246 is prevented from escaping into the process chamber 245 by the inboard mechanical seal faces 248. The seal 240 prevents the barrier fluid escaping to the atmospheric side 249 of the cartridge mechanical seal 241.

Stator 250 of seal 240 is a separate and replaceable part of the cartridge mechanical seal gland 251. Clearly, the stator could be an integral part if so desired.

Figure 14:
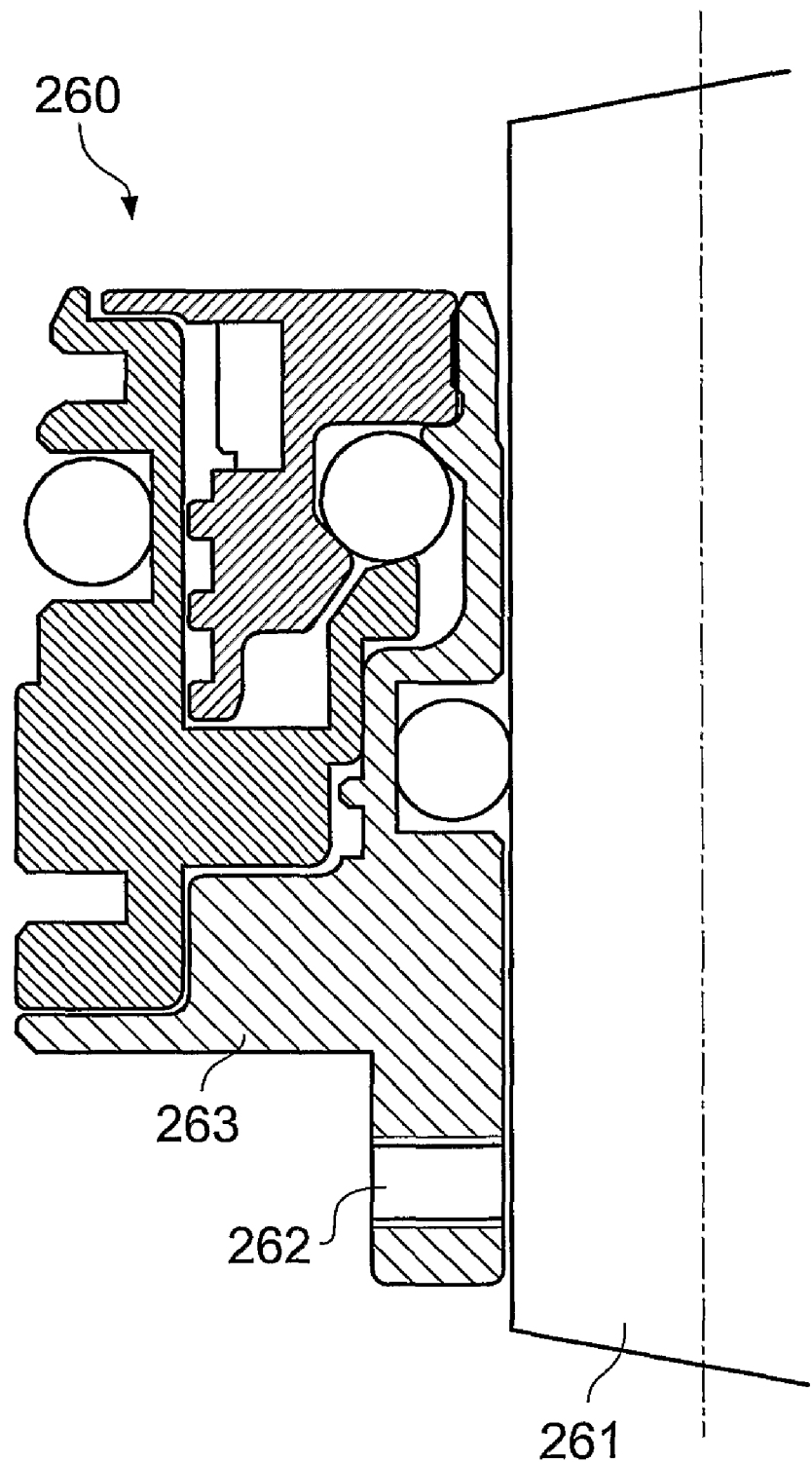
FIG. 14 shows another embodiment of the invention in the form of a bearing seal positively secured to the rotating shaft.

Referring to FIG. 14, a labyrinth seal 260 is positively secured to a rotating shaft 261 by one or more set screws 262 mounted in an axially extended rotor 263.

Figure 15:
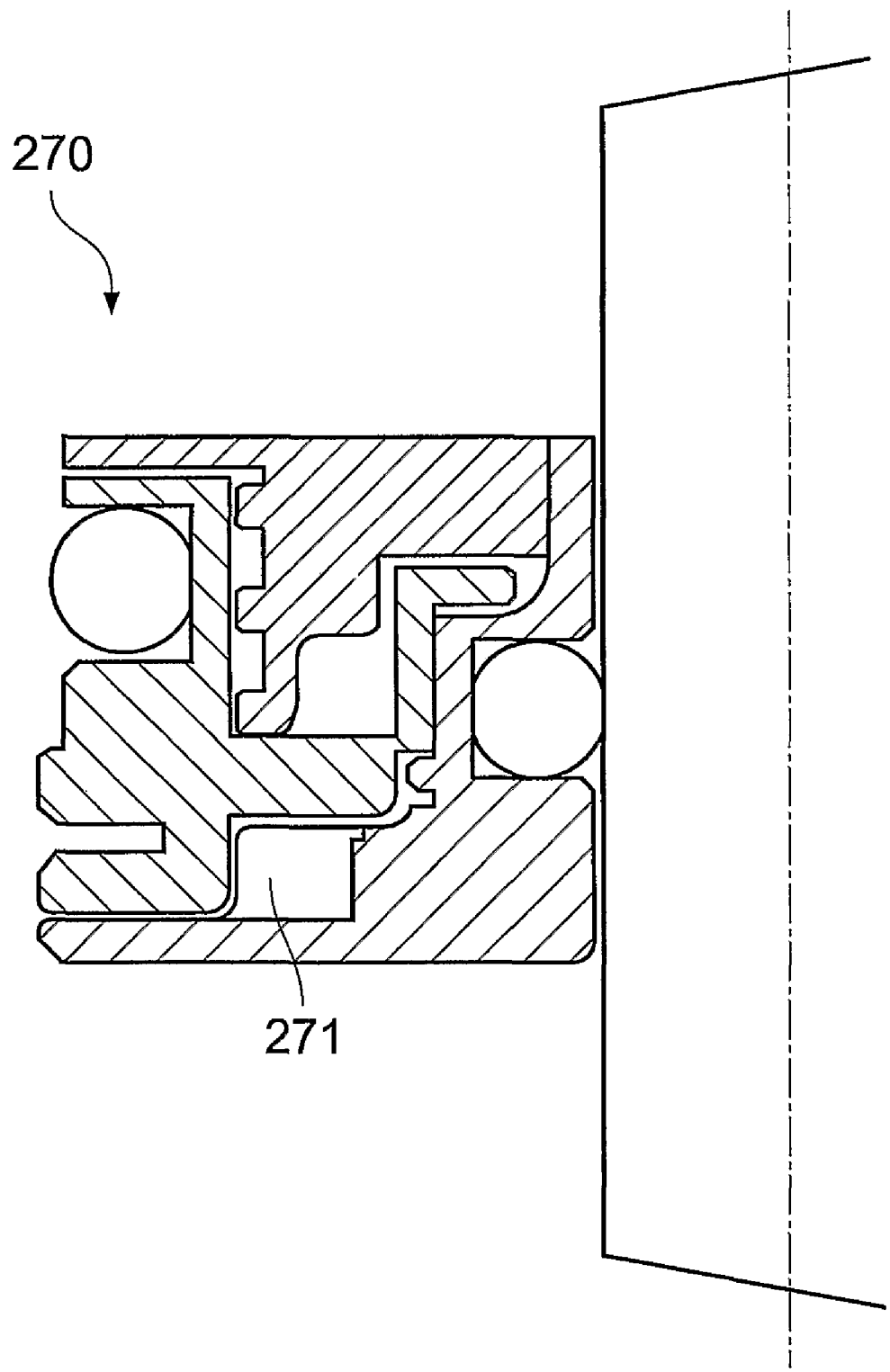
FIG. 15 shows another embodiment of the invention in the form of an axially compact labyrinth seal containing one repelling pumping device on the atmospheric substance side.

Referring to FIG. 15, an axially compact labyrinth seal 270 contains one repelling pumping device 271 on the atmospheric substance side.

Figure 16:
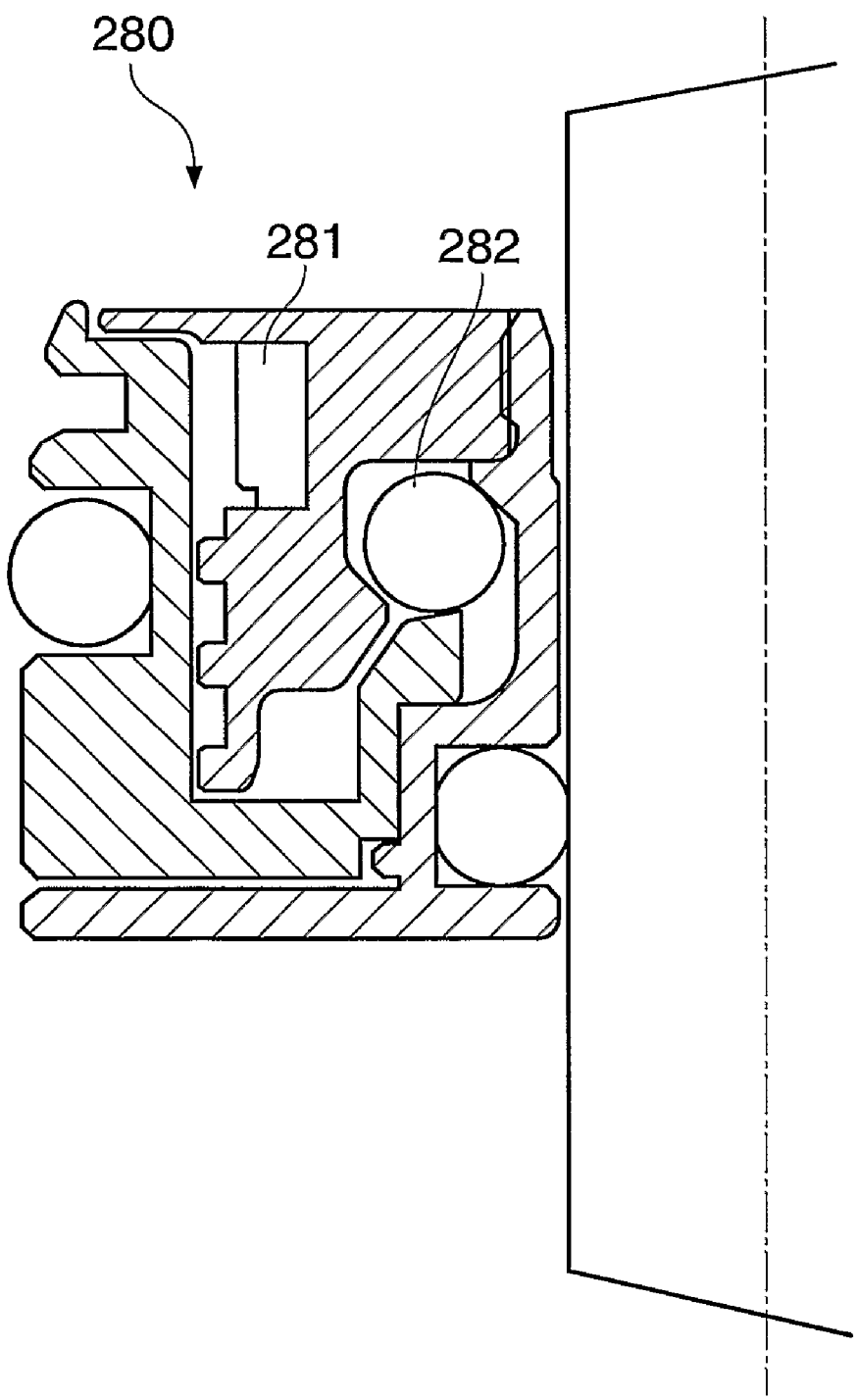
FIG. 16 shows a another embodiment of the invention in the form of an axially compact labyrinth seal containing one repelling pumping device on the atmospheric substance side and a shut-off sealing device.

Referring to FIG. 16, an axially compact labyrinth seal 280 contains one repelling pumping device 281 on the atmospheric substance side and a shut-off sealing device 282.

Figure 17:
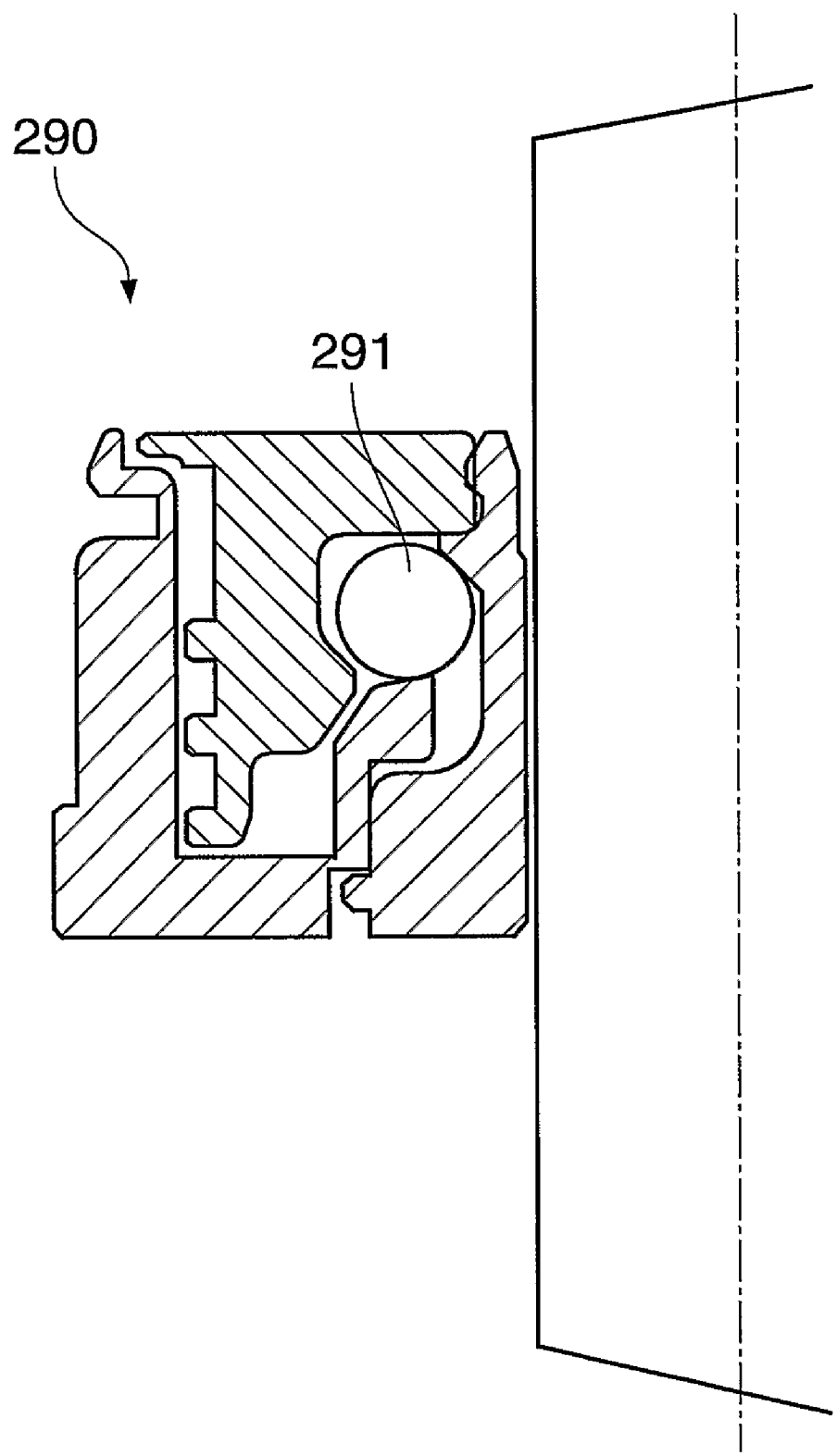
FIG. 17 shows another embodiment of the invention in the form of an axially compact labyrinth seal 290 containing a shut-off sealing device.

Referring to FIG. 17, an axially compact labyrinth seal 290 contains a shut-off sealing device 291.

Figure 18:
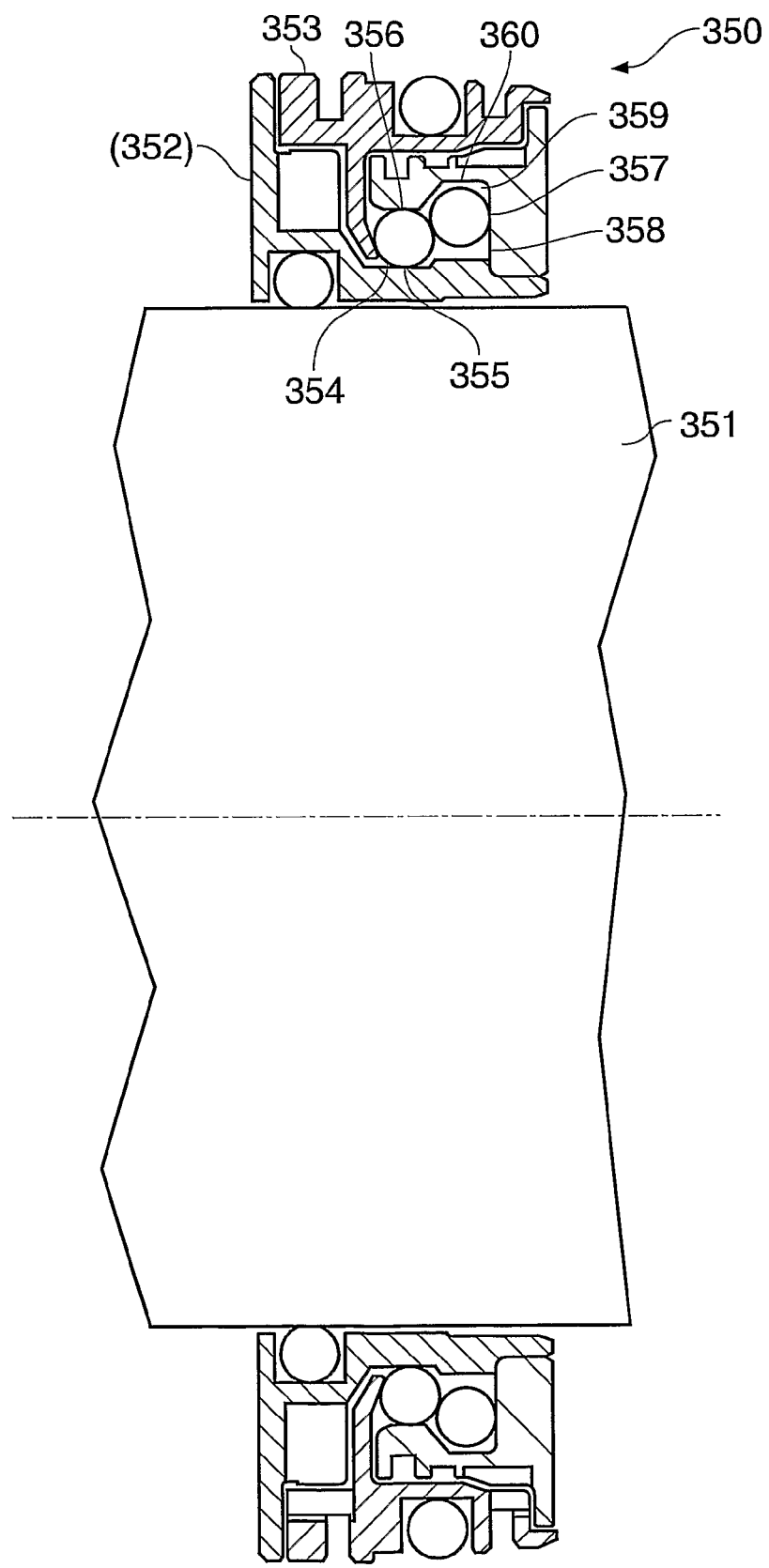
FIG. 18 shows a longitudinal cross section view of another embodiment of the invention in the form of a labyrinth seal bearing protector mounted on a shaft, of the twentieth embodiment of the invention.

Referring to FIG. 18, a labyrinth seal bearing protector 350 is mounted on a shaft 351. Rotor assembly 352 and stator 353 are generally configured in a similar way to that described with reference to FIG. 1.

The reader will note that stator to rotor toroidal elastomer 354 is radially captured by the inner rotor surface 355 and outer rotor surface 356, However, said 354 can move axially so to sealingly engage with the stator.

Adjacent to elastomer 354 is rotary axial biasing elastomer 357. Said axial biasing elastomer 357 is preferably radially larger than elastomer 355 but of similar cross sectional area. Axial biasing elastomer 357 is axially captured between axial surface 358 of the rotor 352 and the axial surface of elastomer 354. Preferably, said elastomer 357 is slightly axially compressed thereby exerting an axial force on elastomer 354 urging it to sealingly engage with stator 353.

Figure 19:
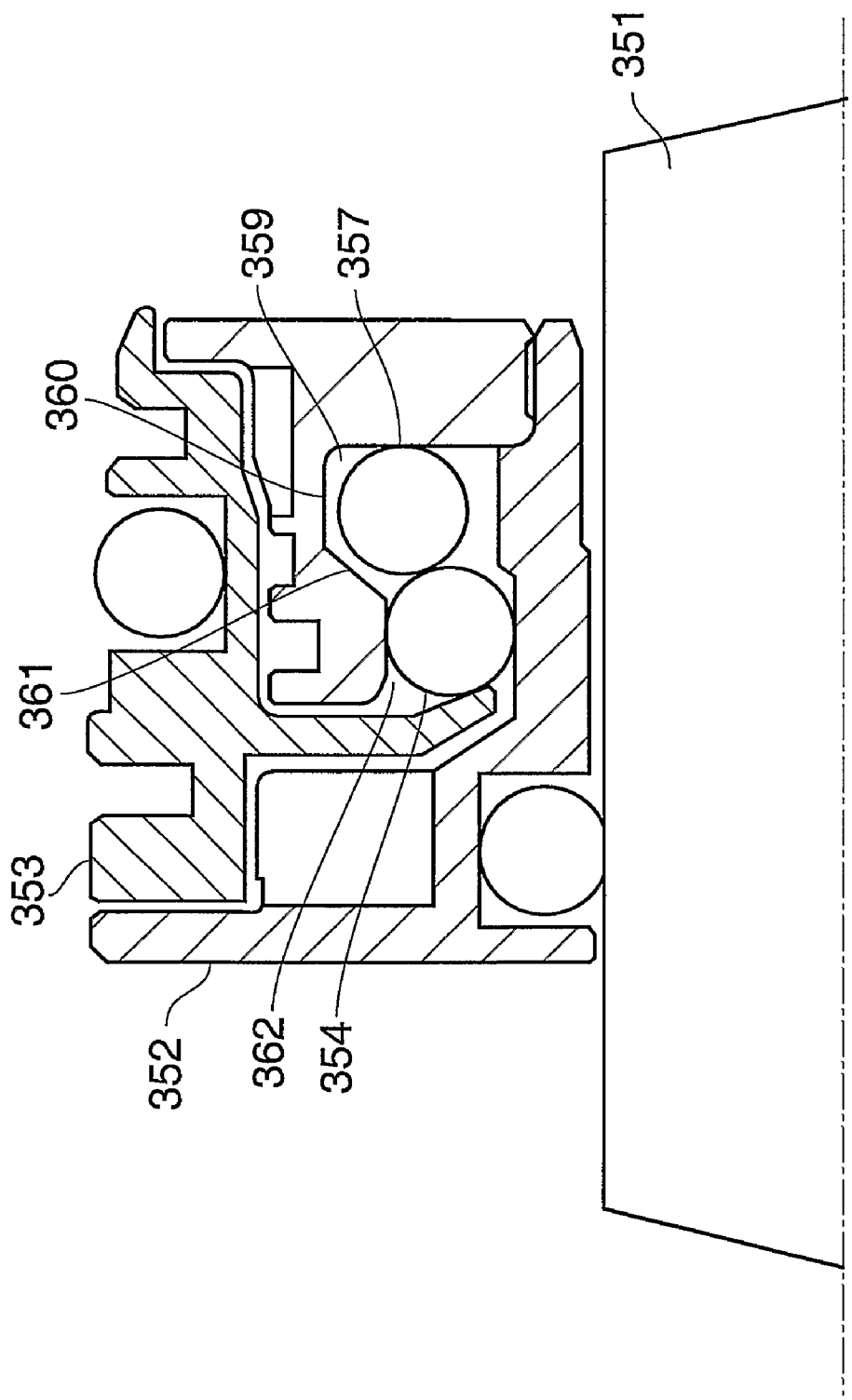
FIG. 19 corresponds to FIG. 18 and shows an enlarged partial cross section view.

The axial biasing elastomer 357 may circumferentially stretch in rotor recess 359 as shown more clearly in FIG. 19. Radial recess 359 in rotor 352 is preferably 0.010" radially larger than the outermost surface of elastomer 357. Preferably, the adjacent surface 361 is radially inclined, as shown. However, said surface could be perpendicular to shaft 351.

Accordingly, there is stator 353 to rotor 352 sealing when the equipment shaft 351 and seal 350 are static. When the equipment shaft 351 and seal 350 are dynamic, the elastomer 357 is subject to centrifugal forces of the rotating assembly encouraging the elastomer 357 circumferentially to stretch. This circumferential stretching action removes the axial biasing force from elastomer 354 allowing said elastomer 354 to axially float in the radially confined recess 362. The frictional resistance between elastomer 354 and stator 353 is sufficient to encourage the elastomer 354 to move axially into the space previously occupied by elastomer 357 thereby creating an axial gap between the rotor assembly 352 and the stator 353.

Figure 20A:
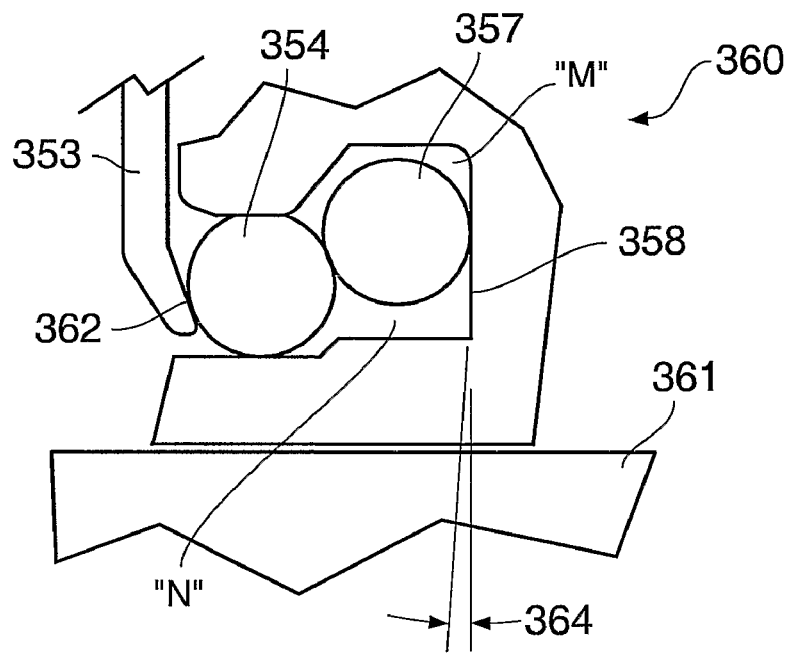
FIG. 20A shows an enlarged partial cross section view of a further embodiment of the invention, showing the seal in the static condition.
Figure 20B:
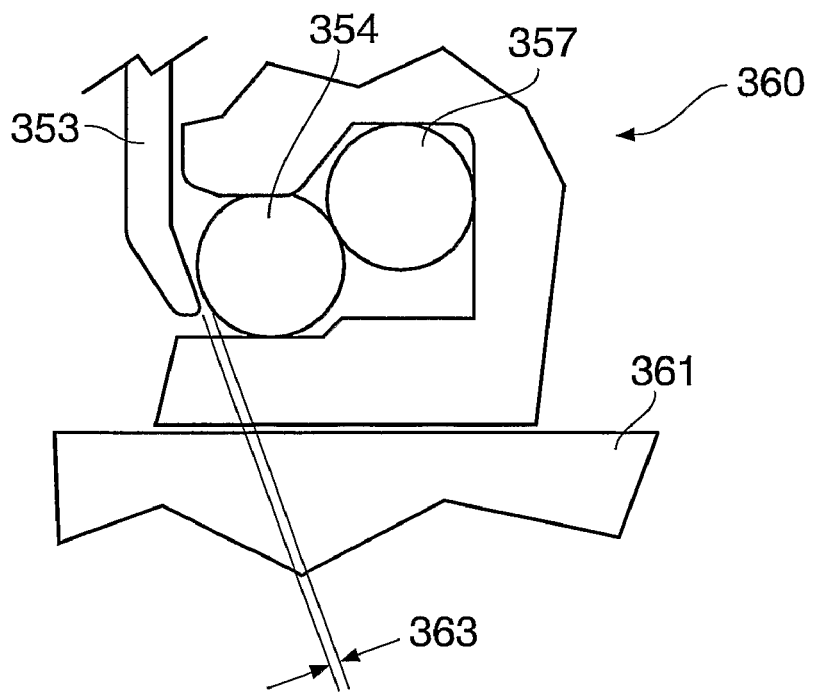
FIG. 20B corresponds to FIG. 20A and shows an enlarged partial cross section view, showing the seal in the dynamic condition.

Referring to FIG. 20A, showing the seal 360 in the static position, rotary elastomer 354 sealingly engages stator 353 at surface 362. In the dynamic position shown in FIG. 20B, rotary elastomer 354 is axially displaced from stator 353 showing an axial gap 363.

Axial rotor surface 358 is axially inclined, as indicated at 364, such that the axial gap "N" adjacent to the innermost surface of elastomer 357 is axially smaller than the axial gap "M" adjacent to the outermost surface of elastomer 357.

When the equipment is static, the innermost surface of elastomer 357 is typically 0.005" to 0.010" radially larger than its nominal radial size in its free state, termed herein as radial pre-load.

The combination of the initial radial pre-loading on elastomer 357 and the axially inclined surface 358 encourages an axial force exerted on elastomer 354. As elastomer 357 circumferentially stretches, the inclined surface 358 actively encourages an axial gap to be created.

The above-described arrangement has significant technical advantages.

Firstly, an axial sealing engagement between the rotor and stator is a more reliable solution over a radial sealing engagement.

Secondly, the material properties, specifically the density, of the respective elastomers 354 and 357 can be technically selected to suit the purpose of these elastomers. For example, it is preferable that elastomer 354 is a hard elastomer, typically between 70 and 90 shore hardness, so that it is more resistant to counter rotational frictional wear. It is preferably that elastomer 357 is more resilient and circumferentially stretchable and typically has a shore hardness of 40-70.

Not only different densities of the same material may be selected, but also different materials can be selected. For example, elastomer 354 could be made from a PTFE material whereas elastomer 357 could be made from a material such as Viton, as supplied by Dupont Dow elastomers. As a further example, the material of elastomer 354 may be selected to include self-lubricating properties, making it ideal for interfacing with counter sliding and/or rotating surfaces.

Figure 21A:
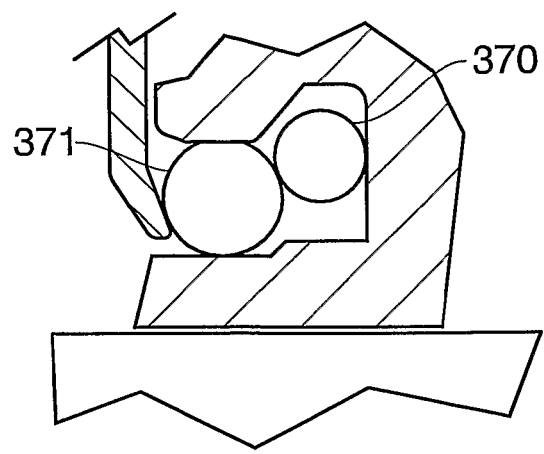
FIG. 21A shows an enlarged partial cross section view of a further embodiment of the invention.

Referring to FIG. 21A, an alternative arrangement provides significant advantages in that elastomer 370 could be of a solid toroidal shape with a smaller cross-sectional area than elastomer 371. The elastomer 370 is therefore be more likely to circumferentially stretch in slower shaft speed applications.

Figure 21B:
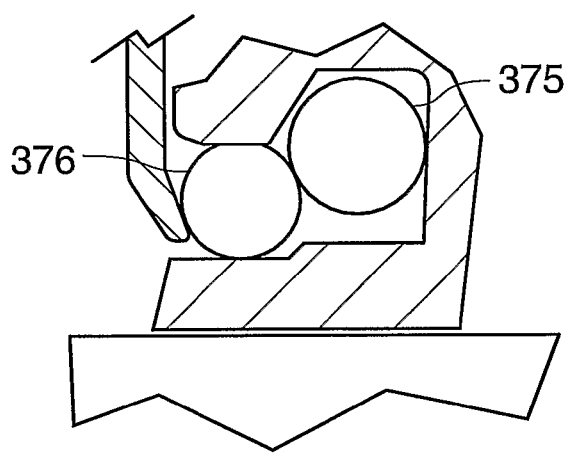
FIG. 21B shows an enlarged partial cross section view of another embodiment of the invention.

Referring to FIG. 21B, an alternative design provides significant advantages in that elastomer 375 is of a solid toroidal shape with a larger cross-sectional area than elastomer 376. Elastomer 375 therefore provides a greater degree of axial compression to elastomer 376.

Figure 21C:
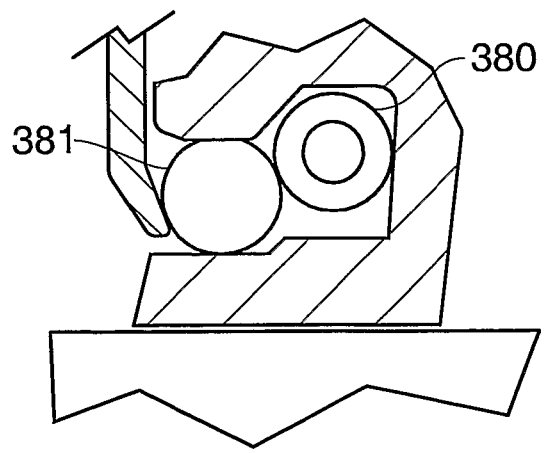
FIG. 21C shows an enlarged partial cross section view of another embodiment of the invention.

Referring to FIG. 21C, a further alternative design provides significant advantages in that elastomer 380 is of a hollow toroidal shape. Elastomer 380 is therefore more likely to circumferentially stretch in slower shaft speed applications.

The axial biasing member 357, 370, 375 and/or 380 could be a spring-like member or a wedge-shaped member. In fact any form of toroidal shape can be utilised, as exemplified by FIGS. 21D, 21E, 21F and 21G herewith described.

Figure 21D:
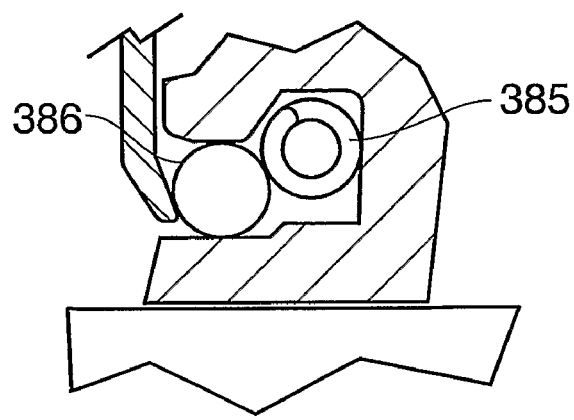
FIG. 21D shows an enlarged partial cross section view of another embodiment of the invention.

FIG. 21D shows a spring-like member 385, as the axial biasing member, adjacent to the sealing member 386. Spring-like member 385 is a closed loop garter spring which is circumferentially extendable when subject to an internal radial force greater than the in-built tension of the spring.

Figure 21E:
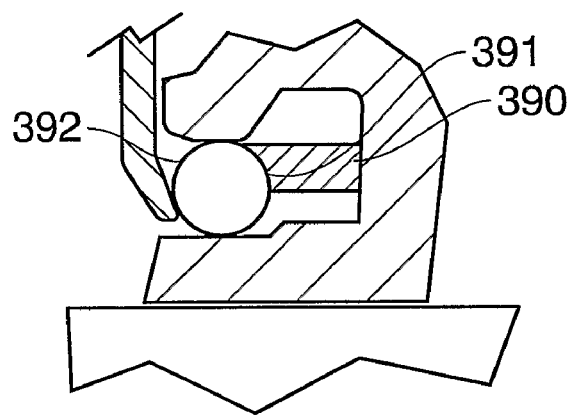
FIG. 21E shows an enlarged partial cross section view of another embodiment of the invention.

FIG. 21E shows a wedge-like member 390 which may or may not be fully or partially radially split at one or more of its circumferential points. Wedge member 390 provides one or more angled surfaces 391, which provides axial biasing to the sealing member 392.

Figure 21F:
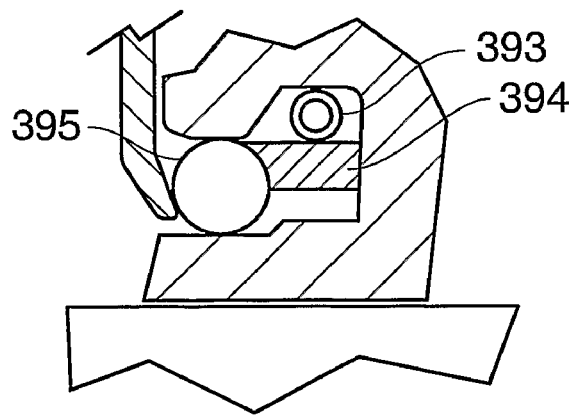
FIG. 21F shows an enlarged partial cross section view of another embodiment of the invention.

FIG. 21F shows a spring-like member 393 which energises a wedge-like member 394 which in turn provides axial biasing to the sealing member 395.

Figure 21G:
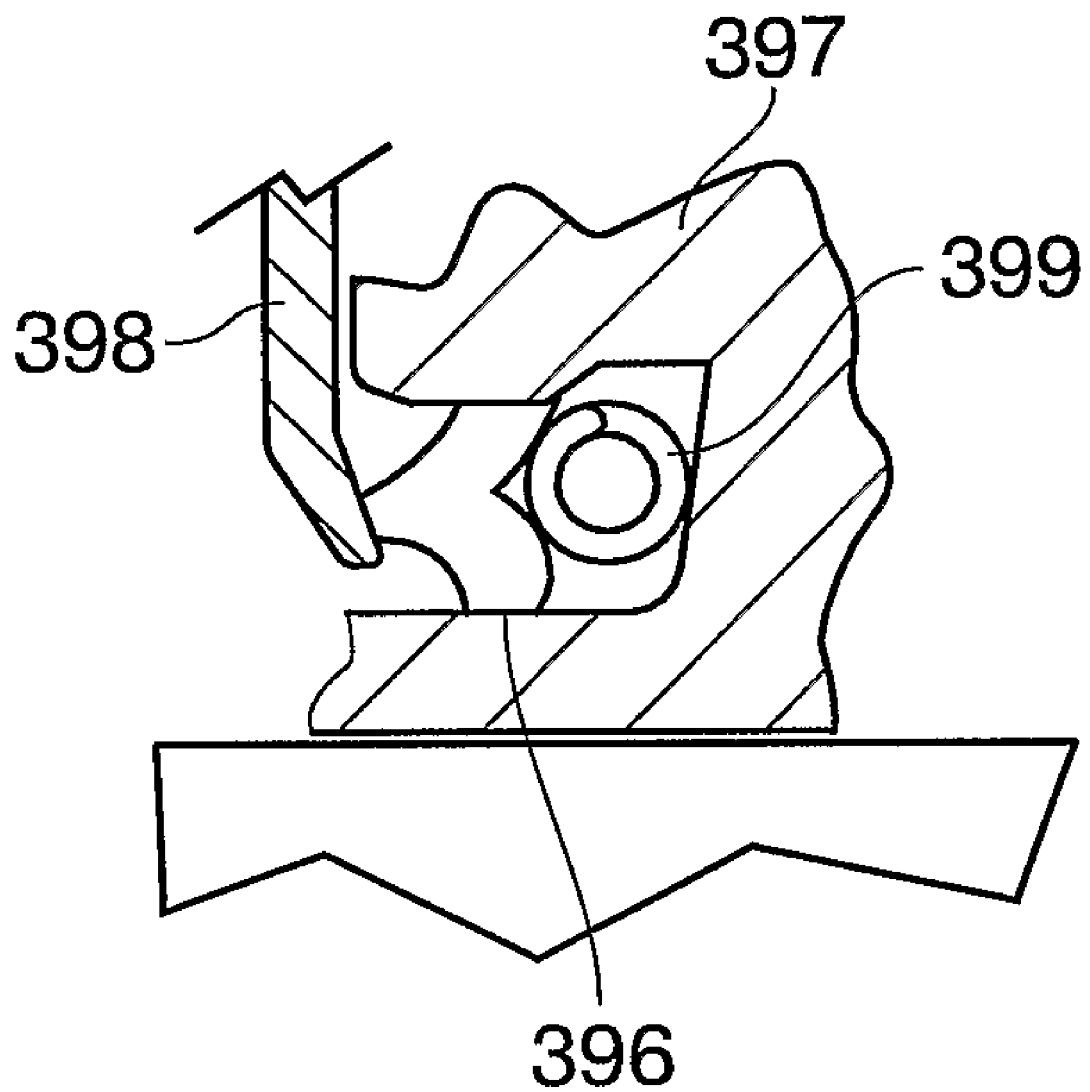
FIG. 21G shows an enlarged partial cross section view of another embodiment of the invention.

FIG. 21G shows a lip-like toroid 396 providing the primary shut-off sealing between counter rotational parts 397 and 398. Lip-like toroid 396 may be axially energised by any suitable means, including, as shown, a spring-like member 399.

Referring to FIG. 22I shows a seal 400 comprising a rotor 401 and a stator 402. The rotor 401 is axially constrained by the stator radially extending shoulder 403 and circlip 404.

The rotor 401 is sealed and rotatably connected to the equipment shaft 405 by elastomer 406 and the stator is sealed and rotatably connected to the equipment housing 407 by elastomer 408.

The rotor 401 contains one or more radially extending castellations 410 and/or 411 and/or 412 on the rotors 401 outwardly exposed surfaces adjacent to the inwardly exposed surfaces 413, 414 of stator 402.

Stator surfaces 413 and/or 414 are non-concentric to the rotor surfaces 410 and/or 411 as illustrated in the lower section of the cross section at positions 416 and 417. The varying radial gap of the non-concentric surfaces, between the rotor outward surface and stator inward surface promotes fluid movement.

It should be noted that the seal 400 does not necessarily require radial, non-continuous indentations or pumping slots on the rotor outer surfaces 410 and/or 411 in order to promote fluid movement.

Figure 23:
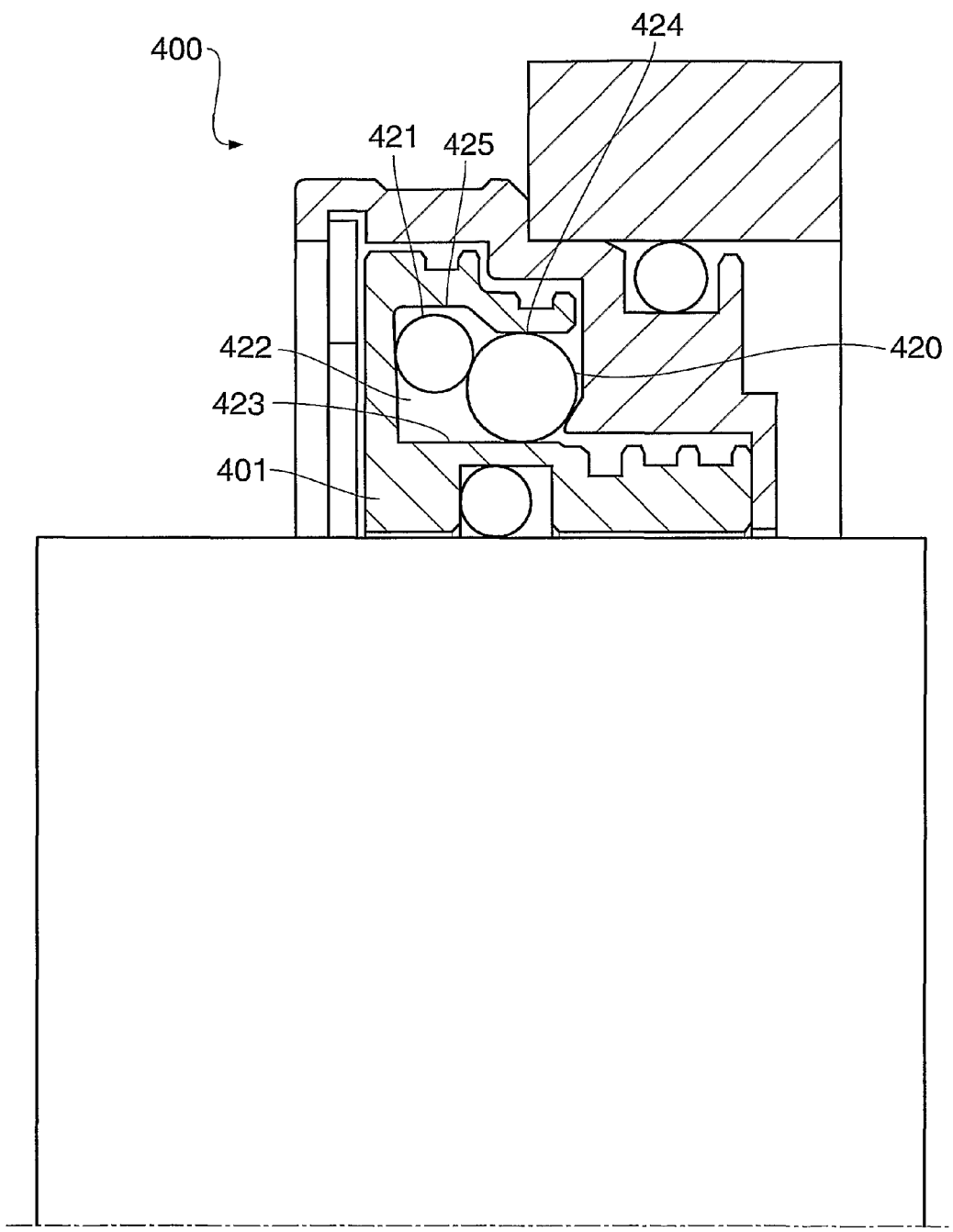
FIG. 23 corresponds to FIG. 22 and shows an enlarged partial cross section view of this embodiment.

Referring to FIG. 23, as shown the shut-off feature, comprising solid toroid 420 axially energised by solid toroid 421, is shown in greater detail. The monolithic rotor 401 construction, provides an axially extending cavity 422 which contains at least one outwardly facing surface 423 and at least one inwardly facing surface 424, but, preferably, two inwardly facing surfaces 424 and 425.

Figure 24:
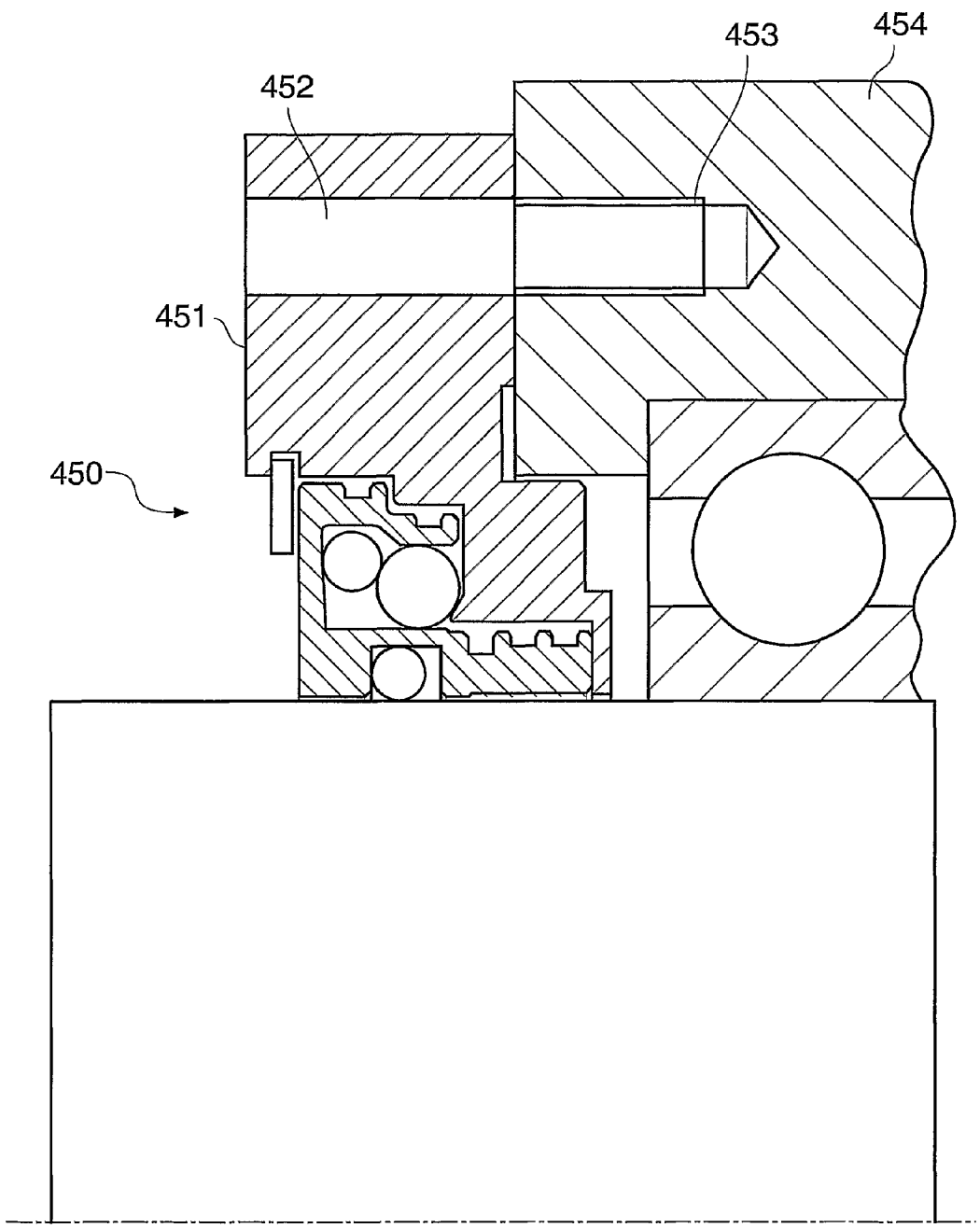
FIG. 24 shows an enlarged partial cross section view of another embodiment of the invention.

Referring to FIG. 24, seal 450 includes a housing 451 which is radially extended to replace the bearing chamber cover cap (shown as a separate item in previous Figures). This has substantial commercial advantages to a rotating equipment manufacturer in that it eliminates one part from the overall assembly.

Housing 451 contains an axial hole 452, which corresponds to a threaded hole 453 in the bearing chamber 454 of the rotating equipment, allowing the housing 451 it to be axially secured to the bearing chamber 454.

FIG. 24 shows how the rotary assembly 460 is de-connected from the housing 451, while the housing remains in situ with the bearing chamber 454 of an item of rotating equipment. This design accordingly offers ease of repair and/or replacement of counter-rotating wearing members 461.

A summary of the various embodiments of the invention, as described above, now follows;

The FIG. 1 embodiment is a cartridge non-contacting labyrinth type seal, comprising one or more radial castellations creating a labyrinth, two repelling pumping devices at the product and atmospheric substance sides and a shut-off device. This design is particularly advantageous at preventing the ingress and egress of fluid and/or solid into a bearing cavity.

The FIG. 2 embodiments are particularly advantageous to the user as not only is the pumping system highly efficient by the use of a rotor operating in an eccentric pumping chamber, but because the device is rotationally bi-directional. This means that the same non-contacting bearing protector of the invention can be used to seal either end of a typical industrial bearing chamber, where the shaft would rotate both clockwise (as viewed from one side of the chamber) and counter-clockwise.

The embodiments of FIGS. 4A and 6 are particularly advantageous to the user as the shut-off device helps to prevent moisture ingress into the bearing chamber when the equipment is static and the shaft is not rotating. The advantage of such a v-seating area minimises elastomer degradation on equipment start-up and shutdown applications, helping to make the device last longer.

The FIG. 5 embodiment is particularly advantageous in applications where additional protection is required to minimise the volumetric flow of air born molecules through the device of the invention.

The FIG. 7 embodiment is particularly advantageous in applications where product substance movement and/or circulation is deemed appropriate. Such applications may include the use of an oil-mist system to lubricate the bearings in a piece of rotating equipment. The open-vane repeller pumping design incorporating the inclined stator helps facilitate lubrication circulation.

The FIG. 8 embodiment is an inverse design variant to the FIG. 1 embodiment in which the stator comprises two axially and radially joined components and the rotor is monolithic.

The FIG. 9 embodiment is an adaptation of the FIG. 1 embodiment in that the stator housing is adapted to be positively secured to the equipment housing. This positive location is often very practical to install and the device could replace a mechanical seal or packed primary seal chamber in an item of rotating equipment. The stator housing could also incorporate environmental connections to inject or flush a primary or secondary fluid into the invention, which then pumps it into the process cavity. Equally, such a design could be used to re-circulate bearing lubrication fluid from the bearing chamber to, for example, a cooler and then back to the bearing chamber in a closed loop system.

The FIG. 10 embodiment can accommodate any amount of axial movement, if it is mounted in a sliding housing. This is advantageous in applications where shaft movement is excessive because of physical and/or thermal expansion considerations.

The FIG. 11 embodiment allows the invention to be employed on pillar or plummer block arrangements which employ spherical bearings and where shaft to housing angular alignment varies.

Some types of rotating equipment have large shaft diameters. The equipment can take many hours, days or weeks to strip down and replace failed bearing protectors. In such applications it is particularly advantageous if the bearing protector can be installed in situ without stripping down the rotating equipment. In such applications, the split invention of the FIGS. 12A to 12D embodiment is a major benefit. The installation on the rotating equipment is very simple and less time consuming than non-split designs. Furthermore, bearing protection is typically a low duty application with practically zero process pressure and temperature. This makes the simple securing of the two sets of parts, including elastomers, via a sealant or adhesive very suitable and practical.

The FIG. 13 embodiment is effective in complimenting mechanical installations.

The FIG. 14 embodiment can be employed on applications where rotary drive integrity is an issue.

The FIGS. 15, 16 and 17 embodiments of the invention all illustrate variants of axially compact non-contacting bearing protectors. Such embodiments are essential where the invention is to replace oil and lip seals, which are often as axially wide as they are radial wide.

The installation advantages of the FIGS. 12E to 12G embodiment arise because installing seals and components in difficult to access areas is very frustrating. Often components such as screws, fall out of location and often get lost. This embodiment addresses this, by showing one method, as an example only, of how the invention captures the capscrews into the respective halves of the non-contacting sealing device. The capscrews are prevented from falling out of the halves even if the halves are help up-side-down.

The FIGS. 18 to 21 embodiments of the invention, offer a wide range of toroidal additional permutations for the circumferentially stretching member and rotor to stator sealing member, which is particularly advantageous for slower shaft speed applications.

Figure 22:
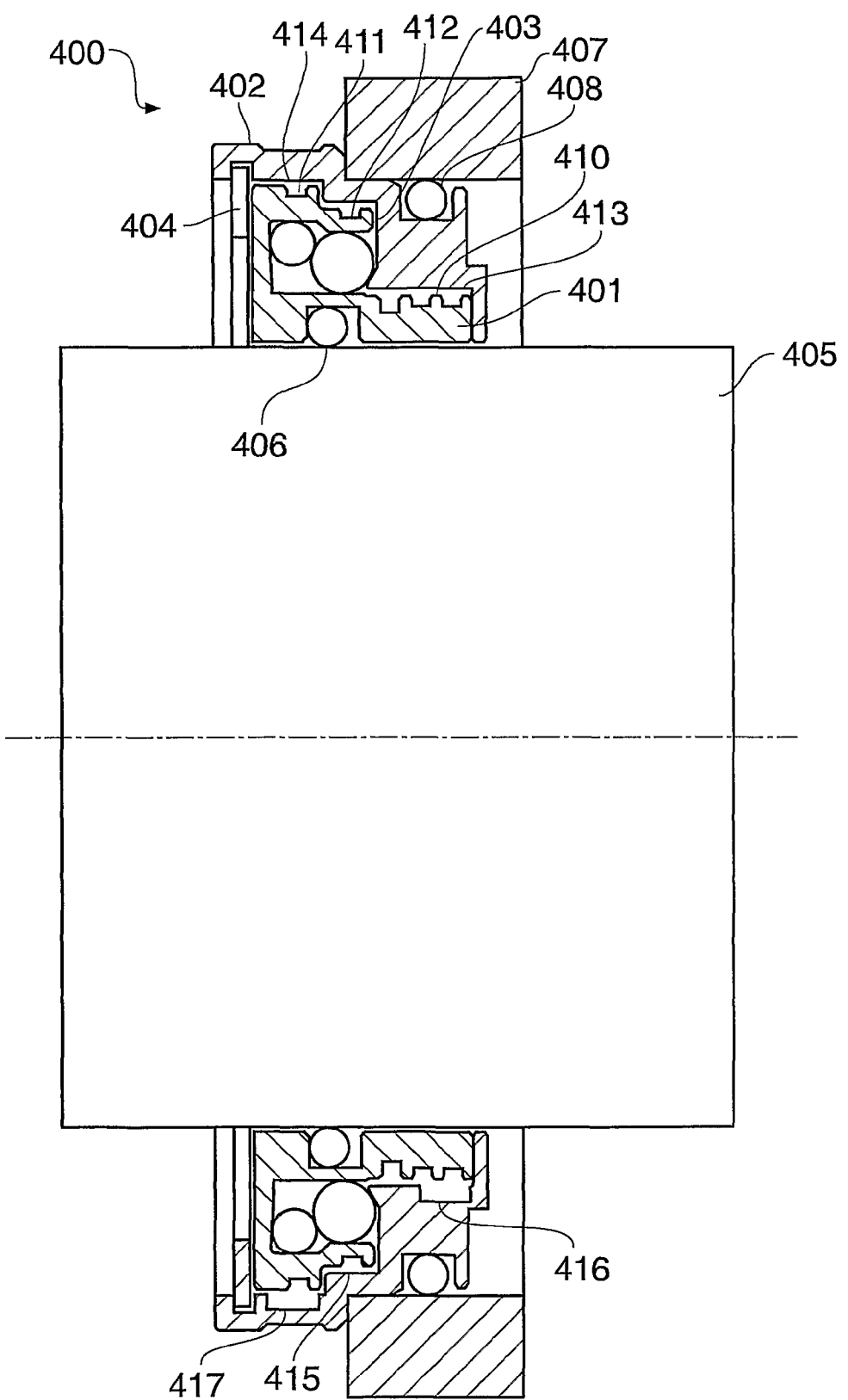
FIG. 22 shows a cross sectional view of another embodiment of the invention, showing a two part design, axially restrained by a radially extending circlip.

The FIGS. 22 and 23 embodiment illustrates a one part rotor design in which the rotor contains an axially and radially extending groove as one monolithic member. This embodiment has commercial advantages over the two part rotor design in that it has fewer parts.

Figure 25:
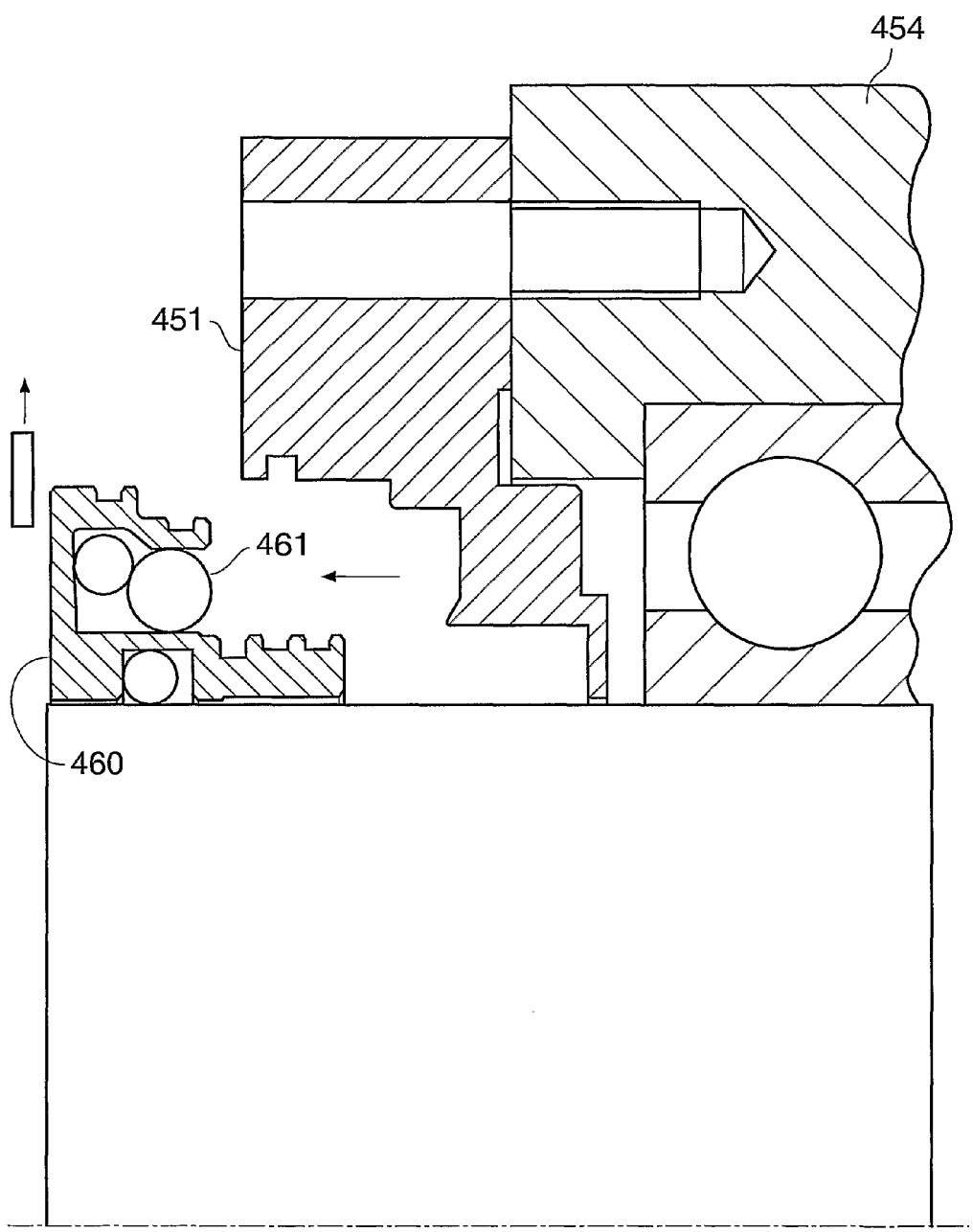
FIG. 25 shows an enlarged partial cross section view of another embodiment of the invention, showing ease of disassembly from the equipment.

The FIGS. 24 and 25 embodiment of the invention illustrates a bearing protection housing which also acts as the cover plate for the bearing housing. This is commercially advantageous to a rotating equipment manufacturer, since it reduces one part of the overall assembly. This embodiment has a radially extending housing and provides a method of axial clamping and/or securing to the rotating equipment bearing chamber.

The invention, as exemplified above, may be used to seal, protect and isolate bearing chambers, fans, pumps, mixers, blowers, rotary valves, electric motors and all other items of rotating equipment which require ingress and/or egress substance protection.

The invention claimed is:

1. An isolator seal, comprising:
a stator member placed on a stator of rotating equipment;
a rotor member placed on a rotary shaft of rotating equipment, said stator member and said rotor member providing respective, adjacent surfaces; and,
a static shut-off device having a resilient annular sealing member and an auxiliary member, movable between a first position, when said rotor member is static, wherein said auxiliary member axially biases said resilient annular sealing member into engagement with both said adjacent surfaces and a second position, radially outwards of said first position, wherein the axial bias of said auxiliary member on said resilient annular sealing member is reduced for moving said resilient annular sealing member away from engagement with said adjacent surfaces via a centrifugal force having to overcome solely the axial bias of said auxiliary member and said resilient annular sealing member moves only axially along the longitudinal axis of said rotary shaft, whereby said resilient annular sealing member disengages one or more of said rotor member and stator member surfaces when said rotor member is dynamic.

2. The isolator seal according to claim 1, wherein said resilient annular sealing member is toroidal.

3. The isolator seal according to claim 1, further comprising a labyrinth seal formed between said rotor member and said stator member.

4. The isolator seal according to claim 1, further comprising at least one bi-directional repelling pumping device.

5. The isolator seal according to claim 1, wherein said rotor and said stator member are axially separated, but constrained against relative axial movement by at least one radially extending member formed on one of said rotor member and said stator member.

6. The isolator seal according to claim 1, wherein said rotor member and stator member are axially constrained by a plurality of radially extending members.

7. The isolator seal according to claim 1, wherein said stator member has least one communication orifice extending between an inner surface of said stator member to an outer surface of said stator member.

8. The isolator seal according to claim 7, wherein the communication orifice is adjacent to a radially extending member provided on said rotor member.

9. The isolator seal according to claim 7, wherein said inner surface of said stator member is substantially eccentric to said rotor member or, when in use, said rotary shaft.

10. The isolator seal according to claim 7, wherein the communication orifice is positioned, in use, at a lowest radial point on said isolator seal.

11. The isolator seal according to claim 1, wherein said stator member has a radially inward extending groove on its outermost surface and a substantially eccentric innermost surface, said radially extending groove extending to a radially most outward point of said innermost surface, thereby creating a communication orifice connecting said innermost surface and said outermost surface of said stator member.

12. The isolator seal according to claim 1, wherein said rotor member includes a plurality of repelling pumping devices axially separated from one another.

* * * * *